(12) United States Patent
Park et al.

(10) Patent No.: US 11,405,725 B2
(45) Date of Patent: Aug. 2, 2022

(54) METHOD FOR CONTROLLING AUDIO OUTPUT BY APPLICATION THROUGH EARPHONES AND ELECTRONIC DEVICE IMPLEMENTING SAME

(71) Applicant: Samsung Electronics Co., Ltd., Gyeonggi-do (KR)

(72) Inventors: Sangwoo Park, Seoul (KR); Eunkyu Lee, Seoul (KR); Wonbae Lim, Seoul (KR); Eujin Ha, Gyeonggi-do (KR); Sunmoek Jung, Gyeonggi-do (KR); Meeryung Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/635,260

(22) PCT Filed: Sep. 7, 2018

(86) PCT No.: PCT/KR2018/010464
§ 371 (c)(1),
(2) Date: Jan. 30, 2020

(87) PCT Pub. No.: WO2019/050317
PCT Pub. Date: Mar. 14, 2019

(65) Prior Publication Data
US 2020/0186926 A1    Jun. 11, 2020

(30) Foreign Application Priority Data

Sep. 8, 2017    (KR) .......................... 10-2017-0114967

(51) Int. Cl.
*G06F 16/44*    (2019.01)
*G06F 3/01*    (2006.01)
(Continued)

(52) U.S. Cl.
CPC .......... *H04R 5/033* (2013.01); *G06F 3/04847* (2013.01); *H04M 3/568* (2013.01); *H04R 1/10* (2013.01); *G06F 2203/04803* (2013.01)

(58) Field of Classification Search
CPC ........... H04M 1/72522; H04M 1/0266; H04M 1/575; H04N 21/4312; H04N 21/4307; G06F 3/165; H04R 2499/15; H04S 1/005
(Continued)

(56) References Cited

U.S. PATENT DOCUMENTS

| | | | |
|---|---|---|---|
| 9,936,296 B1* | 4/2018 | Harrell | H04R 5/0335 |
| 2007/0291961 A1* | 12/2007 | Shin | H04M 1/0233 381/111 |
| 2010/0150383 A1 | 6/2010 | Sampat | |
| 2010/0162116 A1* | 6/2010 | Dunton | G06F 16/44 715/716 |

(Continued)

FOREIGN PATENT DOCUMENTS

| | | |
|---|---|---|
| KR | 1989-0017957 A | 12/1989 |
| KR | 2000-0021599 A | 4/2000 |

(Continued)

OTHER PUBLICATIONS

Korean Search Report dated Jan. 25, 2022.

*Primary Examiner* — George C Monikang
(74) *Attorney, Agent, or Firm* — Cha & Reiter, LLC

(57) ABSTRACT

Various embodiments provide an electronic device and a method, the device comprising: an audio module; a display; a connection terminal connected to earphones; a communication interface; and a processor electrically connected to the audio module, the display, the connection terminal, or the communication interface, wherein the processor is set to display execution screens associated with a first application and a second application through a multi-window, respectively, and output an audio signal corresponding to the first (Continued)

application and an audio signal corresponding to the second application to a left terminal or a right terminal of the earphones separately based on a window position corresponding to each execution screen. In addition, other embodiments are also possible.

17 Claims, 16 Drawing Sheets

(51) Int. Cl.
    *G06F 3/14* (2006.01)
    *H04R 5/033* (2006.01)
    *G06F 3/04847* (2022.01)
    *H04M 3/56* (2006.01)
    *H04R 1/10* (2006.01)

(58) Field of Classification Search
    USPC .......................... 381/74; 715/716; 348/14.03
    See application file for complete search history.

(56) References Cited

U.S. PATENT DOCUMENTS

| | | |
|---|---|---|
| 2010/0248704 A1 | 9/2010 | Pavel |
| 2013/0083150 A1* | 4/2013 | Howarter ............ H04L 65/1096 |
| | | 348/14.06 |
| 2014/0089833 A1* | 3/2014 | Hwang ............... G06F 3/04817 |
| | | 715/780 |
| 2015/0113455 A1 | 4/2015 | Kang et al. |
| 2015/0169216 A1* | 6/2015 | Cho .................... G06F 3/04883 |
| | | 715/764 |

FOREIGN PATENT DOCUMENTS

| | | |
|---|---|---|
| KR | 10-2009-0077934 A | 7/2009 |
| KR | 10-1150630 B1 | 6/2012 |
| KR | 10-1296039 B1 | 8/2013 |
| KR | 10-2013-0131091 A | 12/2013 |
| KR | 10-1414603 B1 | 7/2014 |
| KR | 10-2015-0045121 A | 4/2015 |
| KR | 10-2016-0031403 A | 3/2016 |
| KR | 10-1659410 B1 | 9/2016 |

* cited by examiner (1410)

(1420)

(1430)

(1440)

METHOD FOR CONTROLLING AUDIO OUTPUT BY APPLICATION THROUGH EARPHONES AND ELECTRONIC DEVICE IMPLEMENTING SAME

CLAIM OF PRIORITY

This application is a National Phase Entry of PCT International Application No. PCT/KR2018/010464, which was filed on Sep. 7, 2018 and claims a priority to Korean Patent Application No. 10-2017-0114967, which was filed on Sep. 8, 2017, the contents of which are incorporated herein by reference.

TECHNICAL FIELD

Various embodiments relate to a method and device for controlling audio output for each application through earphones.

BACKGROUND ART

With the recent growth of digital technologies, various types of electronic devices are being widely used such as mobile communication terminals, personal digital assistants (PDAs), electronic organizers, smart phones, tablet personal computers (PCs), wearable devices, etc. These electronic devices are being continuously improved in hardware aspects and/or software aspects, for the sake of function support and enhancement.

For example, the electronic device is providing a multi-window function. The multi-window function can divide one display region into two ones (e.g., a first display region and a second display region), to run different applications in the respective display regions. That is, a user can play a video in the first display region of the electronic device, and execute a memo or e-mail in the second display region of the electronic device, to view the video while checking the memo or e-mail.

DISCLOSURE OF INVENTION

Technical Problem

When applications executed in a multi-window all output audio signals, the conventional electronic device outputs only one audio signal, and does not output the other audio signals. For example, the electronic device can divide one display region into a first display region and a second display region, and play a video in the first display region and play a TV program in the second display region. In this case, the electronic device outputs only an audio signal corresponding to the video, and does not output an audio signal of the TV program. That is, the electronic device controls to mute process the audio signal of the TV program, in order not to output the same through a speaker. Or, the electronic device can overlay two audio signals and output as well.

Various embodiments may provide a method and device capable of outputting audio signals corresponding to applications displayed respectively in at least two divided multi-windows, to a left terminal of earphones and a right terminal thereof, respectively.

Solution to Problem

An electronic device of various embodiments may include an audio module, a display, a connection terminal connected to earphones, a communication interface, and a processor electrically connected to the audio module, the display, the connection terminal, or the communication interface. The processor may be configured to display execution screens associated with a first application and a second application through a multi-window, respectively, and output an audio signal corresponding to the first application and an audio signal corresponding to the second application, to a left terminal of the earphones or a right terminal thereof, separately based on a window position corresponding to each execution screen.

An electronic device of various embodiments may include an audio module, a display, a connection terminal connected to earphones, a communication interface, and a processor electrically connected to the audio module, the display, the connection terminal, or the communication interface. The processor may be configured to display an execution screen of a first application, construct a multi-window in response to a phone event being obtained, display execution screens of the first application and an application associated with a phone through a multi-window, set an audio output path based on a window position corresponding to each execution screen, and output audio signals corresponding to the first application and the application associated with the phone, via the set audio output path, respectively.

An operation method of an electronic device of various embodiments may include displaying execution screens associated with a first application and a second application through a multi-window, respectively, and outputting an audio signal corresponding to the first application and an audio signal corresponding to the second application, to a left terminal of the earphones or a right terminal thereof, separately based on a window position corresponding to each execution screen.

Advantageous Effects of Invention

According to various embodiments, by outputting audio signals corresponding to a plurality of applications separately to a left terminal of earphones and a right terminal thereof respectively, the concurrently outputted two audio signals may be provided without overlay.

According to various embodiments, by providing not to overlay two mutually different audio signals concurrently outputted from at least two or more mutually different applications, a user convenience may be improved.

According to various embodiments, at least two or more users may use one electronic device concurrently.

BEST MODE FOR CARRYING OUT THE INVENTION

Figure 1:
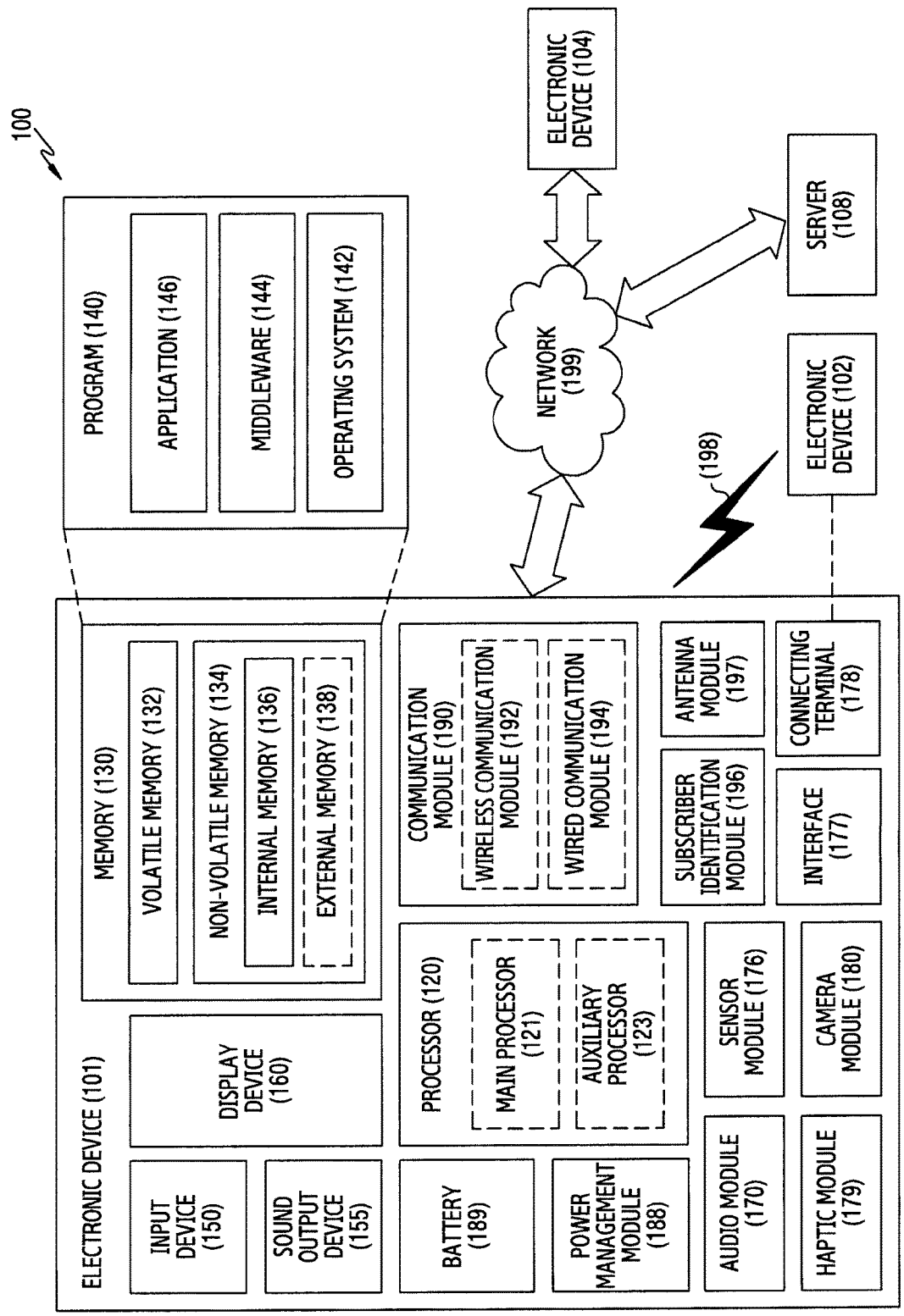
FIG. 1 is a block diagram of an electronic device within a network environment according to various embodiments.

Various embodiments of the present document are mentioned below with reference to the accompanying drawings. An embodiment and terms used therein do not intend to limit the technologies mentioned in the present document to a specific embodiment form, and should be understood to include various modifications, equivalents, and/or alternatives of a corresponding embodiment. With regard to a description of the drawings, like reference numerals may be used to refer like components. And, an embodiment disclosed in the present disclosure has been suggested for explanation and understanding of the technology content disclosed, and does not limit the scope of the technology mentioned in the present disclosure. Accordingly, the scope of the present disclosure should be interpreted as including all changes or various other embodiments that are based on the technological spirit of the present disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

According to an embodiment, the wireless communication module 192 may identify and authenticate the electronic device 101 in a communication network using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101.

According to an embodiment, all or some of operations to be executed at the electronic device 101 may be executed at one or more of the external electronic devices 102, 104. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
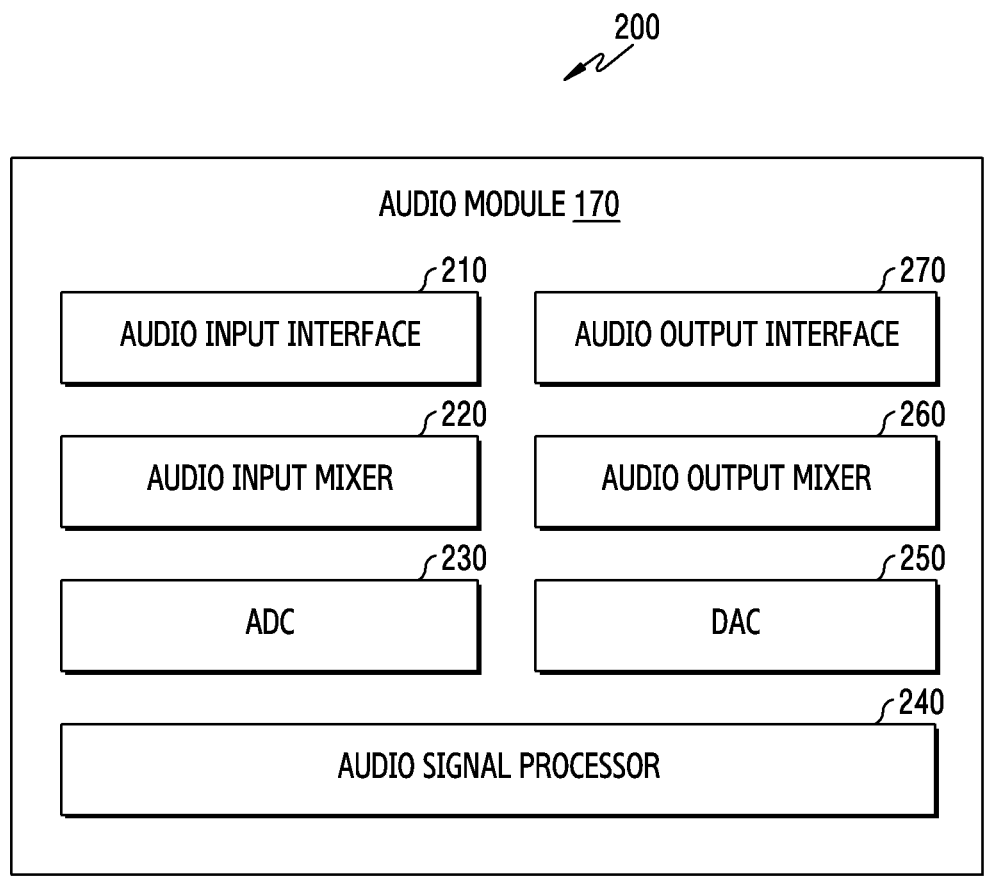
FIG. 2 is a block diagram of an audio module 170 according to various embodiments.

FIG. 2 is a block diagram of the audio module 170 according to various embodiments.

Referring to FIG. 2, the audio module 170 may include, for example, an audio input interface 210, an audio input mixer 220, an analog to digital converter (ADC) 230, an audio signal processor 240, a digital to analog converter (DAC) 250, an audio output mixer 260, or an audio output interface 270.

The audio input interface 210 may receive an audio signal corresponding to sound obtained from the outside of the electronic device 101 via a microphone (e.g., a dynamic microphone, a condenser microphone, or a piezo microphone) which is configured as part of the input device 150 or separately from the electronic device 101. For example, in response to obtaining an audio signal from the external electronic device 102 (e.g., a headset or microphone), the audio input interface 210 may be connected with the external electronic device 102 wiredly via the connection terminal 178 or wirelessly (e.g., Bluetooth communication) via the wireless communication module 192, to receive the audio signal. According to an embodiment, the audio input interface 210 may receive a control signal (e.g., a volume adjustment signal using an input button) related to the audio signal obtained from the external electronic device 102. The audio input interface 210 may include a plurality of audio input channels, and receive a different audio signal by each audio input channel. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. According to an embodiment, the audio input mixer 220 may synthesize a plurality of analog audio signals inputted via the audio input interface 210, into at least one analog audio signal.

The ADC 230 may convert an analog audio signal into a digital audio signal. According to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, the audio signal processor 240 may perform sampling rate change for one or more digital audio signals, applying of one or more filters, interpolation processing, amplification or attenuation (e.g., partial frequency band or whole frequency band amplification or attenuation) processing, noise processing (e.g., noise or echo attenuation), channel change (e.g., switching between mono and stereo), mixing, or specified signal obtaining. According to an embodiment, at least some functions of the audio signal processor 240 may be implemented in the form of an equalizer.

The DAC 250 may convert a digital audio signal into an analog audio signal. According to an embodiment, the DAC 250 may convert a digital audio signal processed by the audio signal processor 240 or a digital audio signal acquired from another component of the electronic device 101, into an analog audio signal.

The audio output mixer 260 may synthesize a plurality of audio signals to be outputted, into at least one audio signal. According to an embodiment, the audio output mixer 260 may synthesize an analog audio signal converted by the DAC 250 and another analog audio signal (e.g., an analog audio signal received via the audio input interface 210), into at least one analog audio signal.

The audio output interface 270 may output an analog audio signal converted by the DAC 250 or, additionally or alternatively, an analog audio signal synthesized by the audio output mixer 260, to the outside of the electronic device 101 via the sound output device 155 (e.g., a speaker (e.g., a dynamic driver or balanced armature driver) or a receiver). According to an embodiment, the sound output device 155 may include a plurality of speakers, and the audio output interface 270 may output an audio signal having a plurality of mutually different channels (e.g., stereo or 5.1 channel) via at least some speakers among the plurality of speakers. According to an embodiment, the audio output interface 270 may be connected with the external electronic device 102 (e.g., an external speaker or a headset) wiredly via the connection terminal 178 or wirelessly via the wireless communication module 192, to output an audio signal.

According to an embodiment, the audio module 170 may synthesize a plurality of digital audio signals to provide at least one digital audio signal as at least a partial function of the audio signal processor 240, without separately including the audio input mixer 220 or the audio output mixer 260.

According to an embodiment, the audio module 170 may include an audio amplifier (not shown) (e.g., a speaker amplifying circuit) capable of amplifying an analog audio signal that is inputted via the audio input interface 210 or an audio signal that will be outputted via the audio output interface 270. According to an embodiment, the audio amplifier may be constructed as a module separate from the audio module 170.

Figure 3:
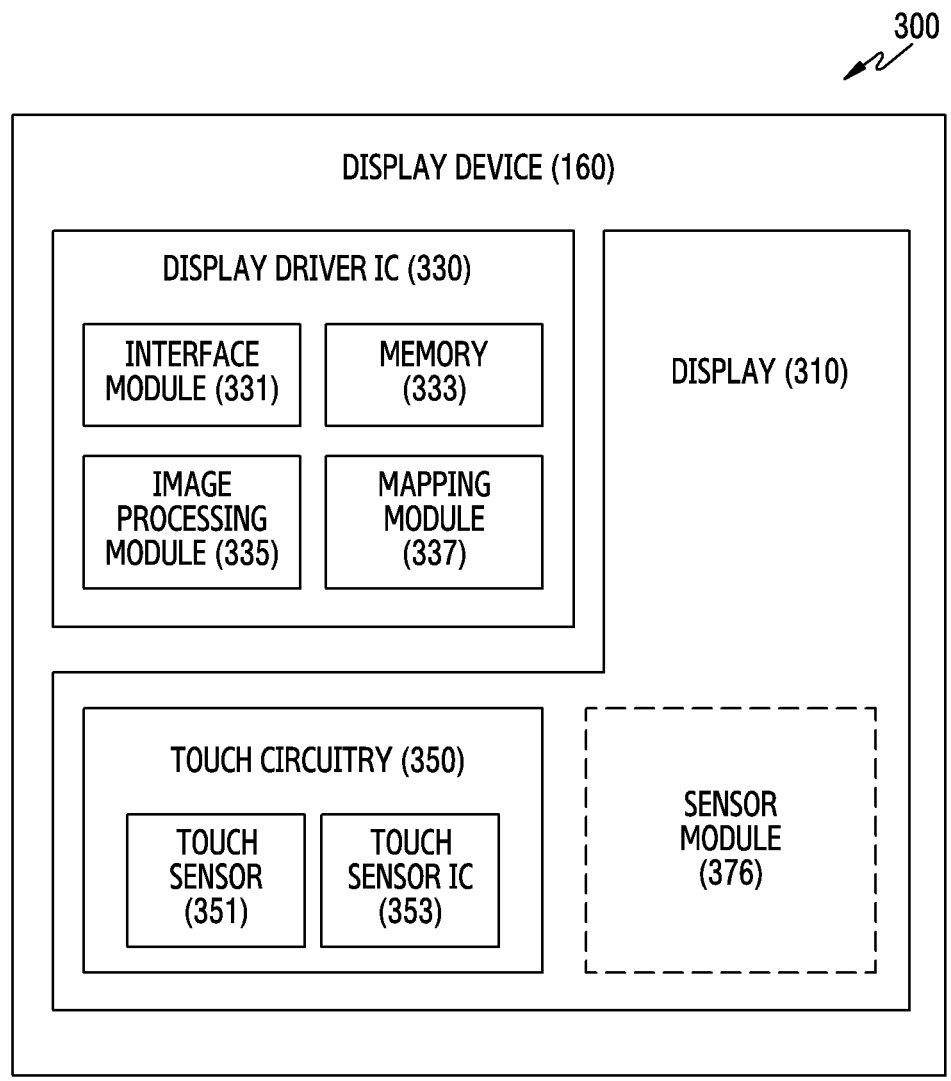
FIG. 3 is a block diagram 300 of a display device 160 according to various embodiments.

FIG. 3 is a block diagram 300 of the display device 160 according to various embodiments.

Referring to FIG. 3, the display device 160 may include a display 310, and a display driver IC (DDI) 330 to control the display 310. The DDI 330 may include an interface module 331, a memory 333 (e.g., buffer memory), an image processing module 335, or a mapping module 337. The DDI 330 may, for example, receive video information which includes video data or a video control signal corresponding to a command for controlling the video data, from the processor 120 (e.g., the main processor 121 (e.g., an application processor) or the auxiliary processor 123 operating independently from a function of the main processor 121) through the interface module 331. The DDI 330 may communicate with a touch circuitry 350 or a sensor module 376, etc. via the interface module 331. Also, the DDI 330 may also store at least part of the received video information in the memory 333, for example, on a frame by frame basis.

The image processing module 335 may, for example, perform pre-processing or post-processing (e.g., resolution, brightness, or size adjustment) for at least part of the video data, based at least on a characteristic of the video data or a characteristic of the display 310. The mapping module 337 may convert the video data pre-processed or post-processed through the image processing module 135 into a voltage value or current value capable of driving pixels of the display 310, based at least on attributes (e.g., an array (RGB stripe or PenTile) of the pixels, or a size of each of sub pixels) of the pixels of the display 310. At least some pixels of the display 310 may be driven, for example, based at least on the voltage value or the current value wherein visual information (e.g., a text, an image or an icon) corresponding to the video data may be displayed on the display 310.

According to an embodiment, the display device 160 may further include the touch circuitry 350. The touch circuitry 350 may include a touch sensor 351, and a touch sensor IC 353 to control the touch sensor 351. The touch sensor IC 353 may control the touch sensor 351, to measure, for example, a variation of a signal (e.g., a voltage, a quantity of light, resistance, or a quantity of electric charge) on a specific position of the display 310, thereby sensing a touch input or hovering input on the specific position, and providing information (e.g., a position, an area, a pressure or time) about the sensed touch input or hovering input to the processor 120. According to an embodiment, at least part (e.g., the touch sensor IC 353) of the touch circuitry 350 may be included as part of the display driver IC 330 or the display 310 or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 376, or a control circuit for the at least one sensor. In such a case, the at least one sensor or the control circuit for the at least one sensor may be embedded in one portion (e.g., the display 310 or the DDI 330) of the display device 160 or one portion of the touch circuitry 350. For example, in response to the sensor module 376 embedded in the display device 160 including a biometric sensor (e.g., a fingerprint sensor), the biometric sensor may obtain biometric information (e.g., a fingerprint image) associated with a touch input via a portion of the display 310. For another example, in response to the sensor module 376 embedded in the display device 160 including a pressure sensor, the pressure sensor may obtain pressure information on a touch input via a partial or whole region of the display 310. According to an embodiment, the touch sensor 351 or the sensor module 376 may be disposed between pixels in a pixel layer of the display 310, or over or under the pixel layer.

Figure 4:
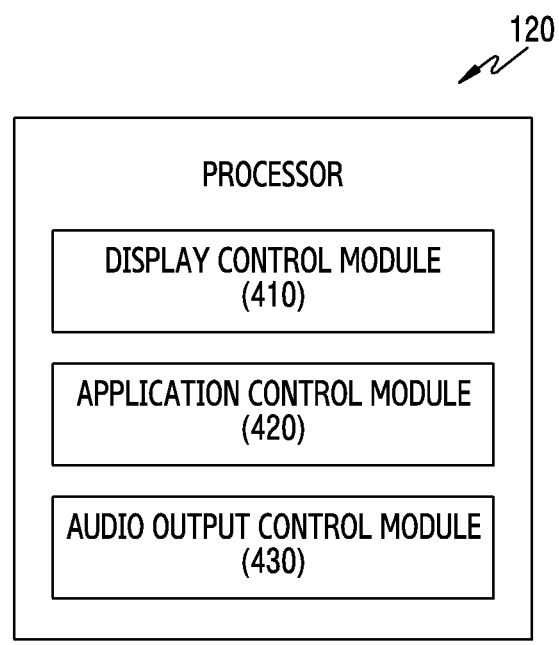
FIG. 4 is a diagram illustrating an example of a processor of an electronic device according to various embodiments.

FIG. 4 is a diagram illustrating an example of a processor of an electronic device according to various embodiments.

Referring to FIG. 4, the processor 120 of the electronic device (e.g., the electronic device 101) may control to output audio signals corresponding to applications displayed respectively in at least two divided multi-windows, to a left terminal of earphones and a right terminal thereof, respectively. For the sake of this, the processor 120 may include a module related with function processing, and the module may be included as a hardware module, or be included as a software module. For example, the processor 120 may include a display control module 410 and an application control module 420, or an audio output control module 430.

Below, a description will be made in which a multi-window consists of a first window and a second window in order to help the understanding of the present disclosure. But, the multi-window may be variously constructed as three or four, etc. in number, and constructing the multi-window is an issue of implementation, so the present disclosure is not limited by the following description.

The display control module 410 may construct a display device (e.g., the display device 160) of the electronic device 101 as a multi-window. The multi-window may divide one display region into two ones (e.g., a first display region and a second display region), and execute mutually different applications in the respective display regions. For example, the display control module 410 may divide one display region of the display device 160 into at least two ones, to construct the multi-window. At this time, the display control module 410 may control a display direction of each window based on a direction (or a display direction) of the electronic device 101.

For example, the display control module 410 may obtain a direction of the electronic device 101 by using a sensor module (e.g., the sensor module 176 (e.g., a gyro sensor)) of the electronic device 101. The display direction is a direction in which the electronic device 101 is put, and may be, for example, a vertical direction (or a vertical mode) or a horizontal direction (or a horizontal mode). In response to the display direction of the electronic device 101 being the vertical direction, the display control module 410 may construct the multi-window wherein each window is divided up (e.g., first window) and down (e.g., second window). Also, in response to the display direction of the electronic device 101 being the horizontal direction, the display control module 410 may construct the multi-window wherein each window is divided left (e.g., first window) and right (e.g., second window).

The application control module 420 may control to display execution screens of at least two or more applications through the constructed multi-window. For example, in response to the multi-window being constructed in a vertical direction, the application control module 420 may control to display an execution screen of a first application in the vertical direction in a first window arranged at an upper side, and display an execution screen of a second application in the vertical direction in a second window arranged at a lower side. Or, in response to the multi-window being constructed in a horizontal direction, the application control module 420 may control to display an execution screen of a first application in the horizontal direction in a first window arranged at a left side, and display an execution screen of a second application in the horizontal direction in a second window arranged at a right side. At this time, the application control module 420 may adjust a size of the execution screen of the first application or the second application based on a display direction of the multi-window. The application control module 420 may zoom in or zoom out up/down or left/right the size of the execution screen of the first application or the second application.

The application control module 420 of various embodiments may construct an execution screen of an application within a window based on at least one of a display direction of a multi-window, a display size or information (e.g., an attribute, a type, etc.) of the application. For example, the application control module 420 may differently or identically construct an execution screen of an application displayed in a general mode of using the entire display region and an execution screen of an application displayed in a multi-window mode of using at least part of the display region. For example, in response to the application being a document application or web page application in which a text is displayed, the application control module 420 may adjust a size of a letter included in the application, or adjust an amount of information included in the application.

Or, in response to not capable of displaying the execution screen of the application in the vertical direction (e.g., a game application and a video application), the application control module 420 may display the execution screen of the application in the horizontal direction, and display, as a non-used region, an up/down partial region of a window displayed in the horizontal direction as well. For example, the non-used region may be displayed in black. Or, in response to not capable of displaying the execution screen of the application in the horizontal direction, the application control module 420 may display the execution screen of the application in the vertical direction, and display, as a non-used region, a left/right partial region of a window displayed in the vertical direction as well.

The audio output control module 430 may control an audio signal for each application displayed through a multi-window. For example, the audio output control module 430 may control the audio signal for each application based on information of an application displayed through the multi-window. In response to only one of at least two applications displayed in the multi-window outputting an audio, the audio output control module 430 may not set an audio output path. Or, in response to all the at least two applications displayed in the multi-window outputting an audio, the audio output control module 430 may set the audio output path. While all of the at least two applications displayed in the multi-window output an audio, and earphones (or headphones) are connected to a connection terminal (e.g., the connection terminal 178) of the electronic device 101 (or a state in which the earphones are connected wirelessly), the audio output control module 430 of various embodiments may set the audio output path.

For example, in response to the multi-window being constructed in the horizontal direction, the audio output control module 430 may set an audio output path corresponding to a first application displayed at a left side (e.g., first window), to a right terminal of the earphones, and set an audio output path corresponding to a second application displayed at a right side (e.g., second window), to a left terminal of the earphones. Or, in response to the multi-window being constructed in the horizontal direction, the audio output control module 430 may set the audio output path corresponding to the first application displayed at the left side (e.g., first window), to the left terminal of the earphones, and set the audio output path corresponding to the second application displayed at the right side (e.g., second window), to the right terminal of the earphones.

In response to the multi-window being constructed in the vertical direction, the audio output control module 430 may set an audio output path corresponding to a first application displayed at an upper side (e.g., first window), to the right terminal of the earphones, and set an audio output path corresponding to a second application displayed at a lower side (e.g., second window), to the left terminal of the earphones. Or, in response to the multi-window being constructed in the vertical direction, the audio output control module 430 may set the audio output path corresponding to the first application displayed at the upper side (e.g., first window), to the left terminal of the earphones, and set the audio output path corresponding to the second application displayed at the lower side (e.g., second window), to the right terminal of the earphones.

The audio output control module 430 of various embodiments may process an audio signal based on information of an application. For example, the audio output control module 430 may control to unite an audio signal corresponding to one application into one, to output to any one terminal of earphones. In response to the earphones being connected to the electronic device 101, the audio output control module 430 may output mutually different audio signals to a left terminal of the earphones and a right terminal thereof according to an application. For example, in a music application, in response to the earphones being connected to the electronic device 101, the audio output control module 430 may output an audio signal in a stereo scheme (e.g., two-channel output). But, because the audio output control module 430 has to output an audio signal corresponding to the music application to any one terminal of the earphones, in response to the audio signal being outputted in the stereo scheme, the audio output control module 430 may unite left/right audio signals into one, to output to any one terminal of the earphones.

For example, the audio output control module 430 may synthesize the left/right audio signals into one by using an audio input mixer (e.g., the audio output mixer 260). The audio output control module 430 may adjust various values such as source levels of left/right audio signals inputted to the audio output mixer 260, a frequency characteristic, an output signal level, etc., to synthesize the two audio signals into one. The audio output control module 430 may control to unite left/right audio signals corresponding to a first application displayed in a first window into one, to output to a right terminal of earphones, and control to unite left/right audio signals corresponding to a second application displayed in a second window into one, to output to a left terminal of the earphones. Or, in response to an audio signal of an application being outputted in a mono scheme (e.g., one-channel output), the audio output control module 430 may output the audio signal to each audio output path without separately processing (e.g., uniting into one) of the audio signal.

Figure 5A:
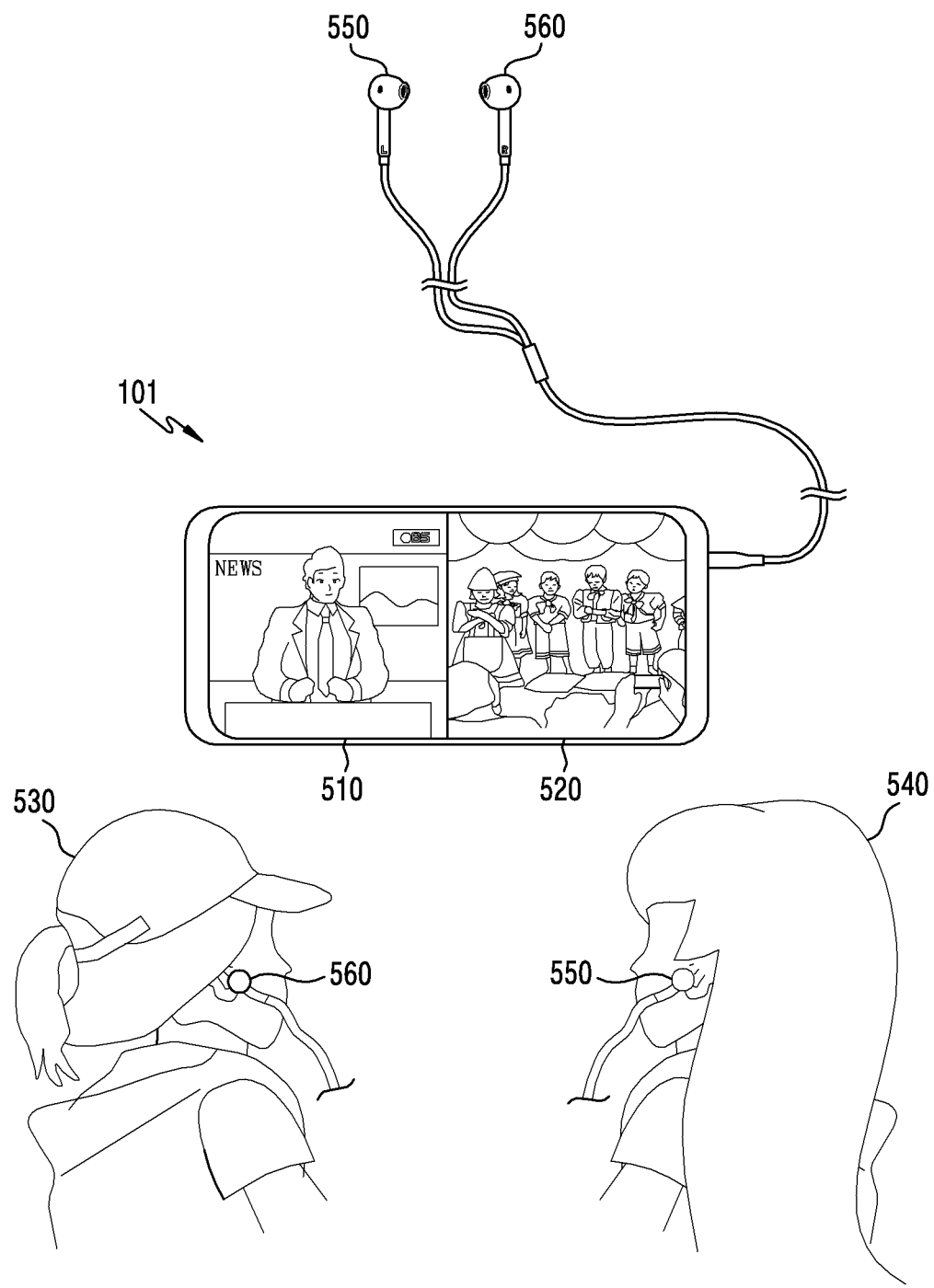
FIG. 5A and FIG. 5B are diagrams illustrating an example of controlling audio output for each application according to various embodiments.
Figure 5B:
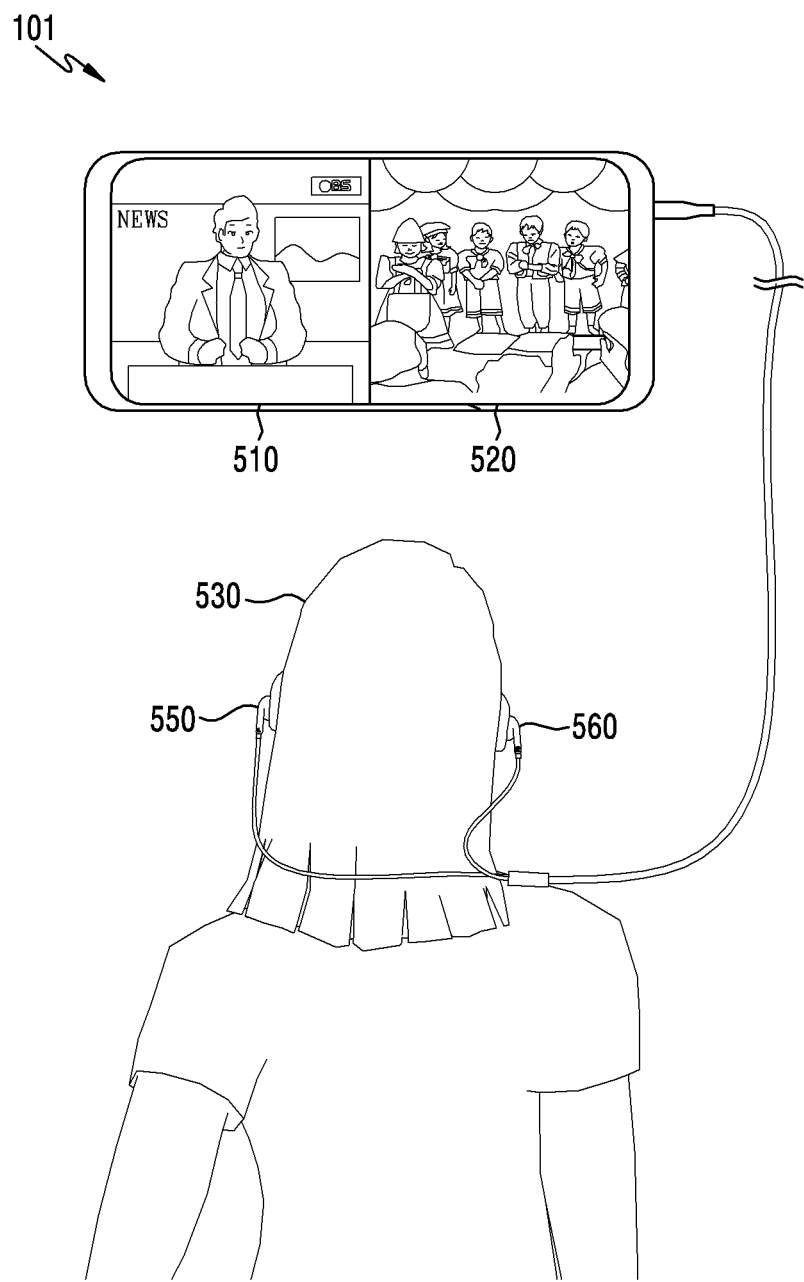

FIG. 5A and FIG. 5B are diagrams illustrating an example of controlling audio output for each application according to various embodiments.

FIG. 5 is a diagram illustrating an example of controlling audio output for each application when two users use an electronic device.

Referring to FIG. 5A, a processor (e.g., the processor 120) of an electronic device (e.g., the electronic device 101) may display an execution screen of an application through a multi-window. For example, while earphones are connecting to a connection terminal (e.g., the connection terminal 178) of the electronic device 101, the processor 120 may construct a multi-window which is divided into two ones in a horizontal direction. The processor 120 may provide a user interface of displaying an execution screen of a first application in a first window 510 arranged at a left side, and displaying an execution screen of a second application in a second window 520 arranged at a right side.

Here, the first application and the second application may be mutually different, and may all output audio signals. For example, the first application may play a TV program, and the second application may play a video or music. The video or music playing may be to play a video or music stored in the electronic device 101 (e.g., a video play application and a music play application), or may be to play a video on the Internet (e.g., a streaming scheme).

The processor 120 may set an audio output path wherein a first audio signal corresponding to the first application is outputted to a right terminal 560 of earphones, and a second audio signal corresponding to the second application is outputted to a left terminal 550 of the earphones. For example, the audio output path outputted to the right terminal 560 of the earphones may be a first audio output path, and the audio output path outputted to the left terminal 550 of the earphones may be a second audio output path.

For example, in response to a first user 530 and a second user 540 using the electronic device 101, the first user 530 may view a first window 510, and the second user 540 may view a second window 520. In this case, the first user 530 may be positioned at a left side of the electronic device 101, and the second user 540 may be positioned at a right side of the electronic device 101 centering on the electronic device 101. Further, in response to the first user 530 and the second user 540 using one earphone, the processor 120 may set an output terminal of the earphones in consideration of a user position.

The earphones are made considering a user's ear shape and thus, the left terminal and the right terminal may be different in shape. Accordingly, the first user 530 positioned at the left side may put the earphone (e.g., the right terminal 560 of the earphones) into his/her own right ear. Also, the second user 540 positioned at the right side may put the earphone (e.g., the left terminal 550 of the earphones) into his/her own left ear. The processor 120 may set the first audio output path corresponding to the first window 510, to the right terminal 560 of the earphones, and set the second audio output path corresponding to the second window 520, to the left terminal 550 of the earphones.

FIG. 5B is a diagram illustrating an example of controlling audio output for each application when one user uses an electronic device.

Referring to FIG. 5B, while the earphones are connecting to a connection terminal (e.g., the connection terminal 178) of the electronic device 101, a processor (e.g., the processor 120) of an electronic device (e.g., the electronic device 101) may construct a multi-window which is divided into two ones in a horizontal direction. The processor 120 may provide a user interface of displaying an execution screen of the first application in the first window 510 arranged at the left side, and displaying an execution screen of the second application in the second window 520 arranged at the right side. Here, the first application and the second application may be mutually different, and may all output audio signals.

The processor 120 may set an audio output path wherein the first audio signal corresponding to the first application is outputted to the left terminal 550 of the earphones, and the second audio signal corresponding to the second application is outputted to the right terminal 560 of the earphones. For example, the first user 530 may construct the electronic device 101 as a multi-window, to view all of the first window 510 and the second window 520. In this case, the processor 120 may output audio output corresponding to the first window 510 arranged at the left side of the electronic device 101, to the left terminal 550 of the earphones centering on the first user 530, and output audio output corresponding to the second window 520 arranged at the right side of the electronic device 101, to the right terminal 560 of the earphones.

In FIG. 5, only wired earphones are illustrated, but the earphones may be wired earphones and wireless earphones.

An electronic device (e.g., the electronic device 101) of various embodiments may include an audio module (e.g., the audio module 170), a display (e.g., the display device 160), a connection terminal (e.g., the connection terminal 178) connected to earphones, a communication interface (e.g., the communication module 190), and a processor (e.g., the processor 120) electrically connected to the audio module, the display, the connection terminal, or the communication interface. The processor 120 may be configured to display execution screens associated with a first application and a second application through a multi-window, respectively, and output an audio signal corresponding to the first application and an audio signal corresponding to the second application, to a left terminal of the earphones or a right terminal thereof, separately based on a window position corresponding to each execution screen.

The processor 120 may be configured to identify the window position corresponding to the execution screen, and identify an audio output path based on the identified window position, and output the audio signal corresponding to each application via the identified audio output path.

The processor 120 may be configured to output the audio signal corresponding to the first application displayed in a first window, to the right terminal of the earphones, and output the audio signal corresponding to the second application displayed in a second window, to the left terminal of the earphones.

The first window may be configured to be arranged at a left side of a horizontal direction, or be arranged at an upper side of a vertical direction, and the second window ma be configured to be arranged at a right side of the horizontal direction, or be arranged at a lower side of the vertical direction.

The processor 120 may be configured to set an audio output path corresponding to each window in consideration of at least one of a display direction of the electronic device, the number of multi-window or the number of the earphones.

The processor 120 may be configured to, in response to a preset user input being obtained, display a menu for controlling a volume of the first application or the second application.

The processor 120 may be configured to adjust a volume level of the first application and a volume level of the second application differently based on the obtained user input.

The processor 120 may be configured to sense window position switching, to change a window displaying the execution screen of each application, and change an audio output path based on a switched window position.

An electronic device (e.g., the electronic device 101) of various embodiments may include an audio module (e.g., the audio module 170), a display (e.g., the display device 160), a connection terminal (e.g., the connection terminal 178) connected to earphones, a communication interface (e.g., the communication module 190), and a processor (e.g., the processor 120) electrically connected to the audio module, the display, the connection terminal, or the communication interface. The processor 120 may be configured to display an execution screen of a first application, construct a multi-window in response to a phone event being obtained, display execution screens of the first application and an application associated with a phone through a multi-window, set an audio output path based on a window position corresponding to each execution screen, and output audio signals corresponding to the first application and the application associated with the phone, via the set audio output path, respectively.

The processor 120 may be configured to construct the multi-window in a vertical direction or a horizontal direction based on a display direction of the electronic device.

The processor 120 may be configured to construct an execution screen of an application within each window based on at least one of a display direction of the multi window, a display size of the multi-window or information of the application.

The processor 120 may be configured to set a window that will display the execution screen of the application associated with the phone, based on information of the application or setting information of the electronic device.

The processor 120 may be configured to, in response to a video call event being obtained while the execution screen of the first application is displayed, identify a video call display scheme, and construct the multi-window based on the video call display scheme The processor 120 may be configured to, in response to the video call display scheme being an overlay scheme, overlay and display the execution screen of the first application in a partial region of a call image included in an application associated with a video call.

The processor 120 may be configured to, in response to obtaining a user input for window position switching, overlay and display the execution screen of the first application in another partial region of the call image, and display the partial region of the call image.

The processor 120 may be configured to, in response to the video call display scheme being a resizing scheme, adjust an execution screen of an application associated with a video call, to display the same concurrently with the execution screen of the first application.

The processor 120 may be configured to construct any one of the execution screen of the first application or the execution screen of the application associated with the phone, in the form of a pop-up window, according to setting of the electronic device or a user's selection.

Figure 6:
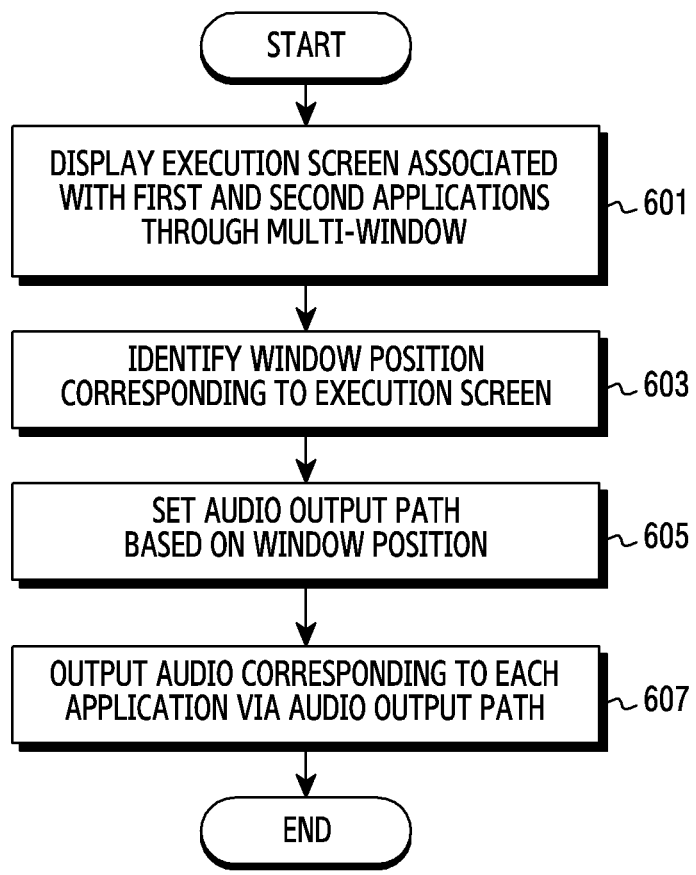
FIG. 6 is a flowchart illustrating an operation method of an electronic device according to various embodiments.

FIG. 6 is a flowchart illustrating an operation method of an electronic device according to various embodiments.

Referring to FIG. 6, in operation 601, a processor (e.g., the processor 120) of an electronic device (e.g., the electronic device 101) may display execution screens associated with a first application and a second application through a multi-window. For example, while earphones are connecting to a connection terminal (e.g., the connection terminal 178) of the electronic device 101, the processor 120 may construct a multi-window which is divided into two ones in a horizontal direction. The processor 120 may provide a user interface of displaying an execution screen of the first application in a first window arranged at a left side, and displaying an execution screen of the second application in a second window arranged at a right side. Or, while the earphones are connecting to the connection terminal (e.g., the connection terminal 178) of the electronic device 101, the processor 120 may construct a multi-window which is divided into two ones in a vertical direction. The processor 120 may provide a user interface of displaying the execution screen of the first application in a first window arranged at an upper side, and displaying the execution screen of the second application in a second window arranged at a lower side. Here, the first application and the second application may be mutually different applications, and may all output audio signals.

In operation 603, the processor 120 of the electronic device 101 may identify a window position corresponding to the execution screen. The processor 120 may identify a display direction of the electronic device 101, and identify the window position in the identified display direction. For example, the processor 120 may identify that the execution screen of the first application is displayed in a left window of the horizontal direction, and the execution screen of the second application is displayed in a right window of the horizontal direction. Or, the processor 120 may identify that the execution screen of the first application is displayed in an upper window of the vertical direction, and the execution screen of the second application is displayed in a lower window of the vertical direction.

In operation 605, the processor 120 of the electronic device 101 may set an audio output path based on the window position. The processor 120 may set a first audio output path correspondingly to the first window, and set a second audio output path correspondingly to the second window. For example, in response to the execution screen of the first application being displayed in the left window (e.g., the first window) of the horizontal direction, the processor 120 may set the first audio output path correspondingly to the first window wherein an audio signal (e.g., a first audio signal) corresponding to the first application is outputted to a right terminal of earphones. Also, in response to the execution screen of the second application being displayed in the right window (e.g., the second window) of the horizontal direction, the processor 120 may set the second audio output path correspondingly to the second window wherein an audio signal (e.g., a second audio signal) corresponding to the second application is outputted to a left terminal of the earphones. Or, in response to the execution screen of the first application being displayed in the upper window (e.g., the first window) of the vertical direction, the processor 120 may set the first audio output path correspondingly to the first window. In response to the execution screen of the second application being displayed in the lower window (e.g., the second window) of the vertical direction, the processor 120 may set the second audio output path correspondingly to the second window.

In operation 607, the processor 120 of the electronic device 101 may output an audio corresponding to each application via the set audio output path. For example, the processor 120 may control to output the first audio signal corresponding to the first application displayed in the first window, to the right terminal of the earphones through the first audio output path. The processor 120 may control to output the second audio signal corresponding to the second application displayed in the second window, to the left terminal of the earphones through the second audio output path. Also, the processor 120 may control to output to the contrary.

Figure 7:
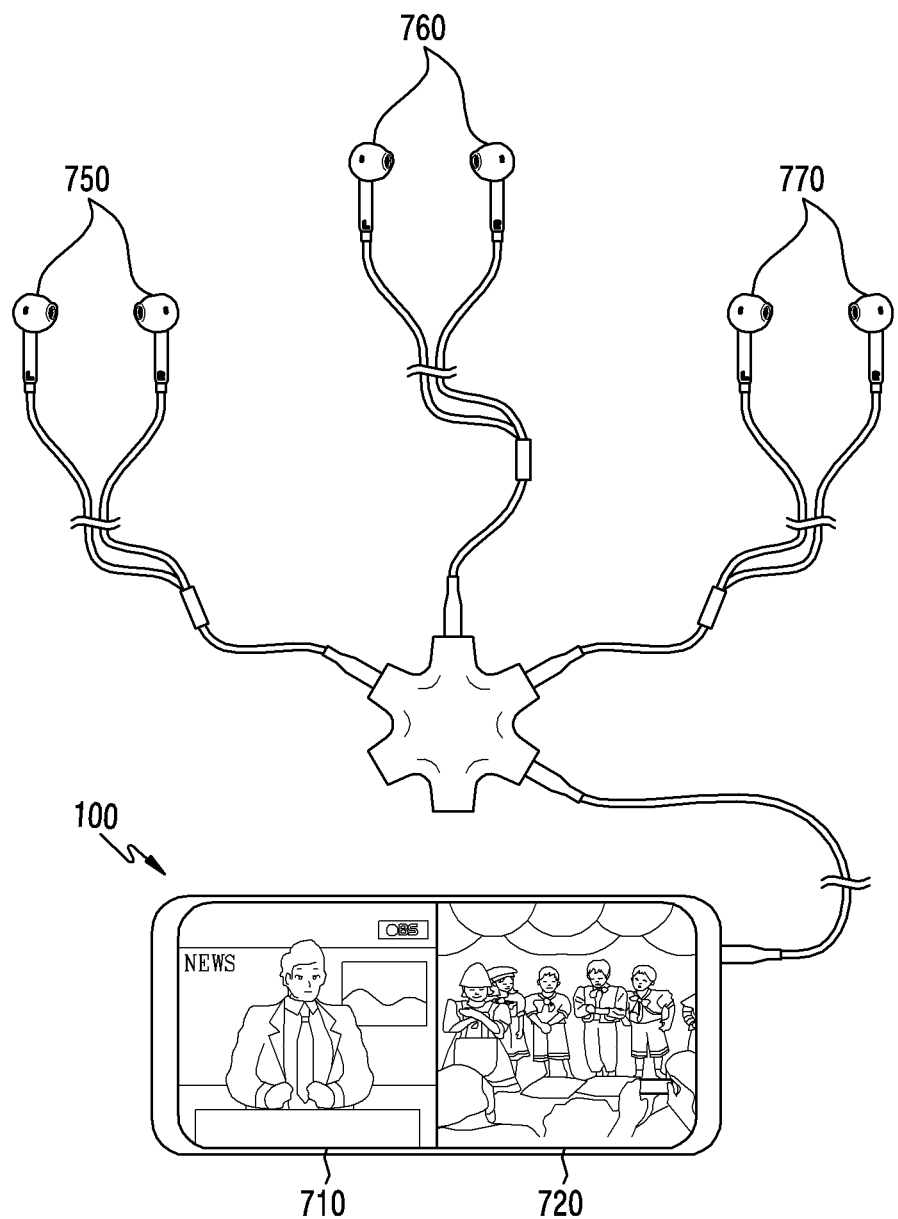
FIG. 7 is a diagram illustrating an example of outputting an audio for each application to a plurality of earphones according to various embodiments.

FIG. 7 is a diagram illustrating an example of outputting an audio for each application to a plurality of earphones according to various embodiments.

Referring to FIG. 7, while earphones (e.g., first earphones 750, second earphones 760 and third earphones 770) are connecting to a connection terminal (e.g., the connection terminal 178) of the electronic device 101, a processor (e.g., the processor 120) of an electronic device (e.g., the electronic device 101) may construct a multi-window which is divided into two ones in a horizontal direction. The processor 120 may provide a user interface of displaying an execution screen of a first application in a first window 710 arranged at a left side, and displaying an execution screen of a second application in a second window 720 arranged at a right side. Here, the first application and the second application may be mutually different, and may all output audio signals.

The processor 120 of various embodiments may set an audio output path corresponding to each window in consideration of at least one of multi-window information (e.g., the number of windows), earphone information (e.g., the number of earphones) and a user position. For example, while the multi-window is constructed, the processor 120 may identify the number of windows and the number of connected earphones. In response to the window being constructed as two, and the number of earphones being one (e.g., the first earphones 750), the processor 120 may set an audio output path wherein an audio signal corresponding to the first application displayed in the first window 710 is outputted to a right terminal of the first earphones 750, and set an audio output path wherein an audio signal corresponding to the second application displayed in the second window 720 is outputted to a left terminal of the first earphones 750. That is, in response to two users sharing one earphone, the processor 120 may set an output terminal of earphones corresponding to each window in consideration of a user position.

In response to the window being constructed as two, and the number of earphones being two (e.g., the first earphones 750 and the second earphones 760), the processor 120 may set an audio output path wherein the audio signal corresponding to the first application displayed in the first window 710 is outputted to the first earphones 750, and set an audio output path wherein the audio signal corresponding to the first application displayed in the second window 720 is outputted to the second earphones 760.

In response to the window being constructed as two, and the number of earphones being three (e.g., the first earphones 750, the second earphones 760 and the third earphones 770), the processor 120 may set an audio output path wherein an audio signal corresponding to the first application displayed in the first window 710 is outputted to the first earphones 750 and the second earphones 760, and set an audio output path wherein an audio signal corresponding to the second application displayed in the second window 720 is outputted to the third earphones 770. Or, the processor 120 may set an audio output path wherein the audio signal corresponding to the first application displayed in the first window 710 is outputted to the first earphones 750, and set an audio output path wherein the audio signal corresponding to the second application displayed in the second window 720 is outputted to the second earphones 760 and the third earphones 770.

Though not illustrated, in response to the window being constructed as three, and the number of earphones being three (e.g., the first earphones 750, the second earphones 760 and the third earphones 770), the processor 120 may set an audio output path wherein an audio signal corresponding to the first application displayed in the first window 710 is outputted to the first earphones 750, and set an audio output path wherein an audio signal corresponding to the second application displayed in the second window 720 is outputted to the second earphones 760, and set an audio output path wherein an audio signal (e.g., a third audio signal) corresponding to a third application displayed in a third window is outputted to the third earphones 770.

In response to a plurality of earphones being connected, the processor 120 of various embodiments may set an audio output path corresponding to each window based on information (e.g., default value) set to the electronic device 101. Or, in response to the plurality of earphones being connected, the processor 120 may set an audio output path corresponding to each window based on a user input. For example, in response to enabling to output the audio signal corresponding to the first application displayed in the first window 710 to the first earphones 750 and the second earphones 760, and output the audio signal corresponding to the second application displayed in the second window 720 to the third earphones 770, the processor 120 may change to output the audio signal corresponding to the first application displayed in the first window 710 to the first earphones 750, and output the audio signal corresponding to the second application displayed in the second window 720 to the second earphones 760 and the third earphones 770, in accordance with a user's selection. In FIG. 7, only wired earphones are illustrated, but the earphones may be wired earphones and wireless earphones.

Figure 8:
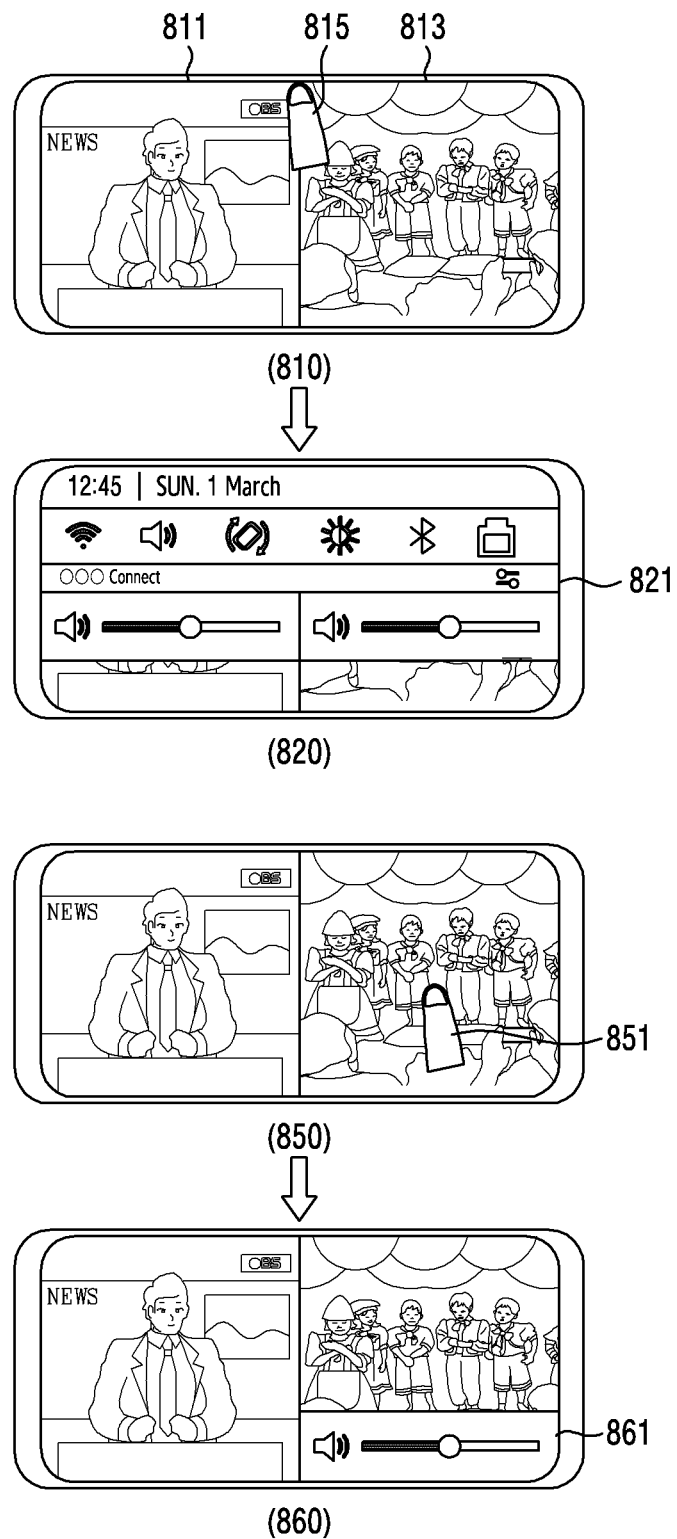
FIG. 8 is a diagram illustrating an example of controlling an audio volume for each application according to various embodiments.

FIG. 8 is a diagram illustrating an example of controlling an audio volume for each application according to various embodiments.

Referring to FIG. 8, a processor (e.g., the processor 120) of an electronic device (e.g., the electronic device 101) may construct a multi-window divided into two ones in a horizontal direction, to provide a first user interface 810 of displaying an execution screen of a first application in a first window 811 arranged at a left side, and displaying an execution screen of a second application in a second window 813 arranged at a right side. While the first user interface 810 is displayed, the processor 120 may obtain a user input 815. The user input 815 may be a drag from a bezel region of a top of the electronic device 101 of a horizontal direction toward a display region.

In response to the user input 815 being obtained, the processor 120 may provide a second user interface 820 including a control menu 821. The control menu 821 may include a first volume adjustment bar for adjustment of a volume of a first application, and a second volume adjustment bar for adjustment of a volume of a second application. The processor 120 may control each of the first volume adjustment bar and the second volume adjustment bar according to a user input, to adjust the volumes of the first application and the second application, respectively. For example, the processor 120 may decrease a volume level of the first application based on a user input of touching the first volume adjustment bar, and increase a volume level of the second application based on a user input of touching the second volume adjustment bar. That is, the processor 120 may differently adjust the volume of the first application and the volume of the second application. Besides this, the control menu 821 may include even an item for controlling communication (e.g., Wi-Fi and Bluetooth) of the electronic device 101, a display direction thereof, an illuminance thereof, a battery thereof, etc.

The processor 120 of various embodiments may identically adjust the volume levels of the first application and the second application based on a user input of touching the first volume adjustment bar or the second volume adjustment bar as well. For example, the initially provided volume levels of the first volume adjustment bar and the second volume adjustment bar may be identical as well and may be different as well. In response to the initially provided volume levels of the first volume adjustment bar and the second volume adjustment bar being different, the processor 120 may identically apply the volume level that is adjusted based on the user input of touching the first volume adjustment bar or the second volume adjustment bar.

The processor 120 may provide a third user interface 850 of displaying the execution screen of the first application in the first window 811 arranged at a left side, and displaying the execution screen of the second application in the second window 813 arranged at a right side. The third user interface 850 may be identical with the first user interface 810. While the third user interface 850 is displayed, the processor 120 may obtain a user input 851. The user input 851 may be a touch input of touching the execution screen of the second application displayed in the second window. The touch input may be a tap input of once pressing a display device (e.g., the display device 160) of the electronic device 101 or be a long press input of long pressing the display device 160.

In response to the user input 851 being obtained, the processor 120 may provide a fourth user interface 860 including a control menu 861. The control menu 861 may include a second volume adjustment bar for adjustment of a volume of the second application. The processor 120 may adjust (e.g., increase or decrease) a volume level of the second application based on a user input of touching the second volume adjustment bar. Though not illustrated, the control menu 861 may further include an item (e.g., play, pause, fast forward, reverse forward, time adjustment bar) for controlling the playing of the second application. Or, in response to a user input being obtained on the execution screen of the first application, the processor 120 may display a first volume adjustment bar for adjustment of the volume of the first application.

A user input (e.g., the user input 815 and the user input 851) of various embodiments may include various kinds of inputs which are previously set to the electronic device 101 so as to adjust a volume at the time of multi-window execution. The processor 120 of various embodiments may differentiate a volume level of an application based on information of the application. For example, the processor 120 may set a volume level of a phone application, greater than a volume level of a video application. Or, the processor 120 may differently set priority order (or weight value) by application, and differentiate a volume level of an application according to the set priority order. For example, the processor 120 may set the volume level of the phone application to the maximum, and set a volume level small in order of a video application, a music application, and a game application. Here, the volume level of the application may mean a level which is initially set after the application is executed. Thereafter, the volume level of the application may be adjusted according to a user's selection, and the adjusted volume level may be stored in a memory (e.g., the memory 130), and be applied in response to the application being executed in the future.

Figure 9:
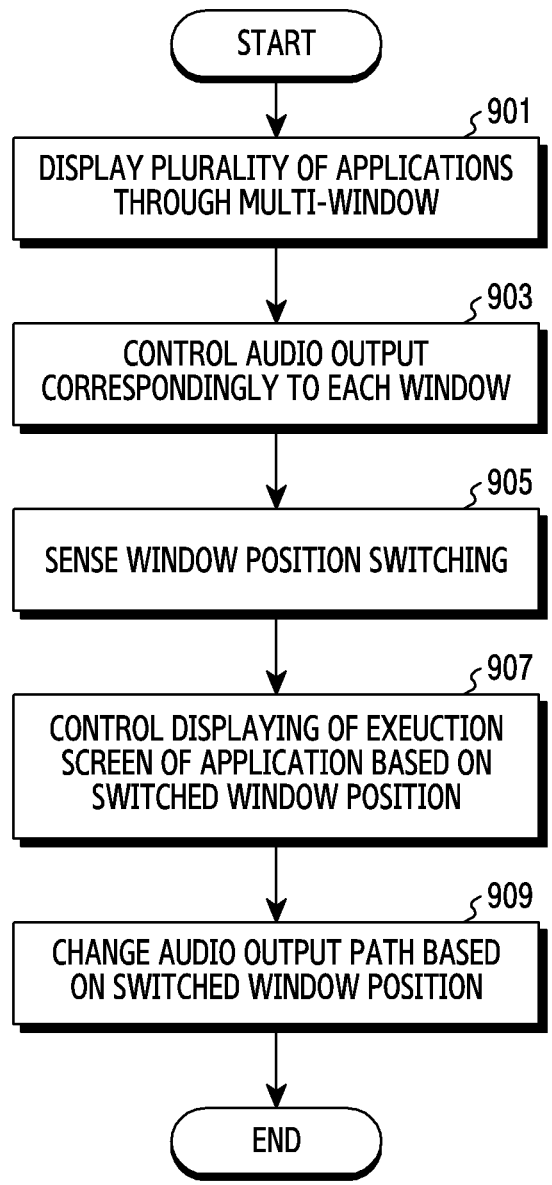
FIG. 9 is a flowchart illustrating a method for changing an audio output path based on a window position in an electronic device according to various embodiments.

FIG. 9 is a flowchart illustrating a method for changing an audio output path based on a window position in an electronic device according to various embodiments.

Referring to FIG. 9, in operation 901, a processor (e.g., the processor 120) of an electronic device (e.g., the electronic device 101) may display a plurality of applications through a multi-window. As in FIG. 5 or FIG. 8, the processor 120 may display an execution screen of a first application in a first window, and display an execution screen of a second application in a second window.

In operation 903, the processor 120 of the electronic device 101 may control audio output correspondingly to each window. For example, the processor 120 may control to process an audio signal corresponding to the first application displayed in the first window, to output to a right terminal of earphones, and control to process an audio signal corresponding to the second application displayed in the second window, to output to a left terminal of the earphones. In response to the audio signal corresponding to the first application being a stereo scheme, the processor 120 may control to unite left/right audio signals corresponding to the first application into one, to output to the right terminal of the earphones. Or, in response to the audio signal corresponding to the first application being a mono scheme, the processor 120 may control to output to the right terminal of the earphones without separately processing (e.g., uniting into one) of the audio signal.

The processor 120 controls display and output through the multi-window. In FIG. 9, it is illustrated that operation 901 is first performed and operation 903 is later performed, but operation 901 and operation 903 may be performed simultaneously.

In operation 905, the processor 120 of the electronic device 101 may sense whether a window position is switched. The window position may be switched based on a user input. For example, the processor 120 may obtain a touch on the execution screen of the first application through a touch circuitry of the electronic device 101, and receive a user input (e.g., a drag and drop) of moving the obtained touch to the execution screen of the second application. Or, the processor 120 may obtain that the obtained touch on the execution screen of the first application is maintained (e.g., long press) during a predetermined time, and receive a user input of flicking the obtained touch toward the execution screen of the second application. Or, the processor 120 may receive a user input in which an inclination of a predetermined angle or more of the electronic device 101 is obtained in a direction of displaying the execution screen of the second application. The user input for the window position switching may be previously set to the electronic device 101 as well, and may be set by a user as well.

Or, the processor 120 may obtain a touch on the execution screen of the second application, and receive a user input of moving the obtained touch to the execution screen of the first application, and obtain that the obtained touch on the execution screen of the second application is maintained (e.g., long press) during a predetermined time, and may receive a user input of flicking the obtained touch toward the execution screen of the first application or a user input in which an inclination of a predetermined angle or more of the electronic device 101 is obtained in a direction of displaying the execution screen of the first application.

In operation 907, the processor 120 of the electronic device 101 may control the displaying of the execution screen of the application based on the switched window position. That is, in response to a user input for switching the window position being obtained in course of displaying the execution screen of the first application in the first window and displaying the execution screen of the second application in the second window, the processor 120 may display the execution screen of the second application in the first window, and display the execution screen of the first application in the second window.

In operation 909, the processor 120 of the electronic device 101 may change an audio output path based on the switched window position. The processor 120 may control to output an audio signal of an application displayed in each window, to an audio output path corresponding to each window. For example, while an audio signal corresponding to the first application displayed in the first window is outputted to a right terminal of earphones, and an audio signal corresponding to the second application displayed in the second window is outputted to a left terminal of the earphones, in response to a user input for switching the window position being obtained, the processor 120 may output the audio signal corresponding to the second application displayed in the first window, to the right terminal of the earphones, and output the audio signal corresponding to the first application displayed in the second window, to the left terminal of the earphones.

In FIG. 9, it is illustrated that operation 907 is first performed and operation 909 is later performed, but operation 907 and operation 909 may be performed simultaneously.

Figure 10:
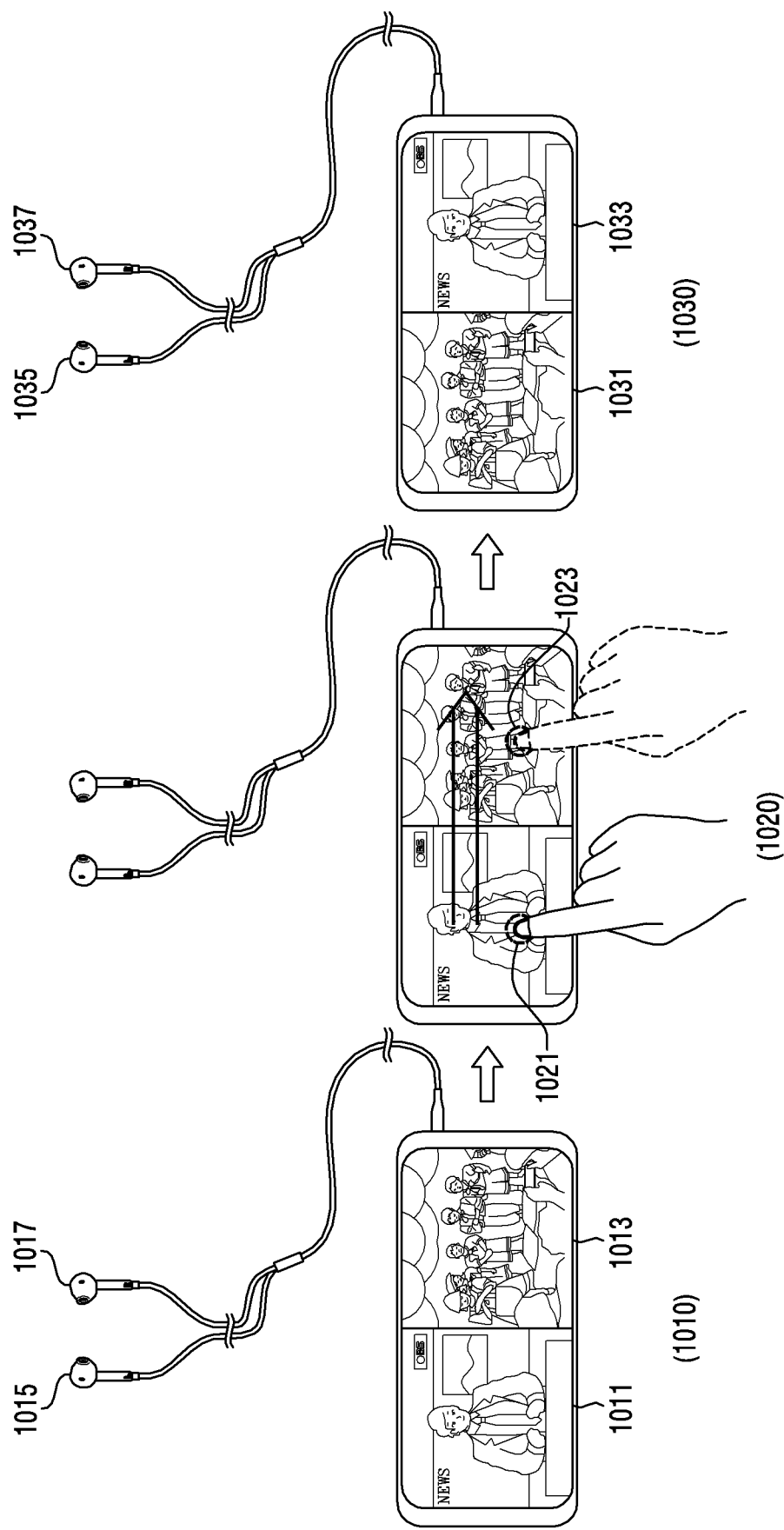
FIG. 10 is a diagram illustrating an example of changing an audio output path in accordance with a window position change according to various embodiments.

FIG. 10 is a diagram illustrating an example of changing an audio output path in accordance with a window position change according to various embodiments.

Referring to FIG. 10, while earphones are connecting to a connection terminal (e.g., the connection terminal 178) of the electronic device 101, a processor (e.g., the processor 120) of an electronic device (e.g., the electronic device 101) may provide a first user interface 1010 of constructing a multi-window divided into two ones in a horizontal direction. The first user interface 1010 may display an execution screen of a first application in a first window 1011 arranged at a left side, and display an execution screen of a second application in a second window 1013 arranged at a right side. The processor 120 may set an audio output path wherein a first audio signal corresponding to the first application is outputted to a right terminal 1017 of earphones, and a second audio signal corresponding to the second application is outputted to a left terminal 1015 of the earphones.

The processor 120 may receive a user input on a second user interface 1020. The second user interface 1020 may be identical with the first user interface 1010. The user input may be an input in which a touch 1021 is obtained on the execution screen of the first application, and the obtained touch 1021 is dragged (1023) to the execution screen of the second application and is released (e.g., dropped).

In response to the user input being obtained, the processor 120 may provide a third user interface 1030 converting an execution screen of an application within a window. The third user interface 1030 may display the execution screen of the second application in a first window 1031 arranged at a left side, and display the execution screen of the first application in a second window 1033 arranged at a right side. In this case, the processor 120 may set an audio output path wherein a second audio signal corresponding to the second application displayed in the first window 1031 is outputted to a right terminal 1037 of earphones, and a first audio signal corresponding to the first application displayed in the second window 1033 is outputted to a left terminal 1035 of the earphones.

Figure 11:
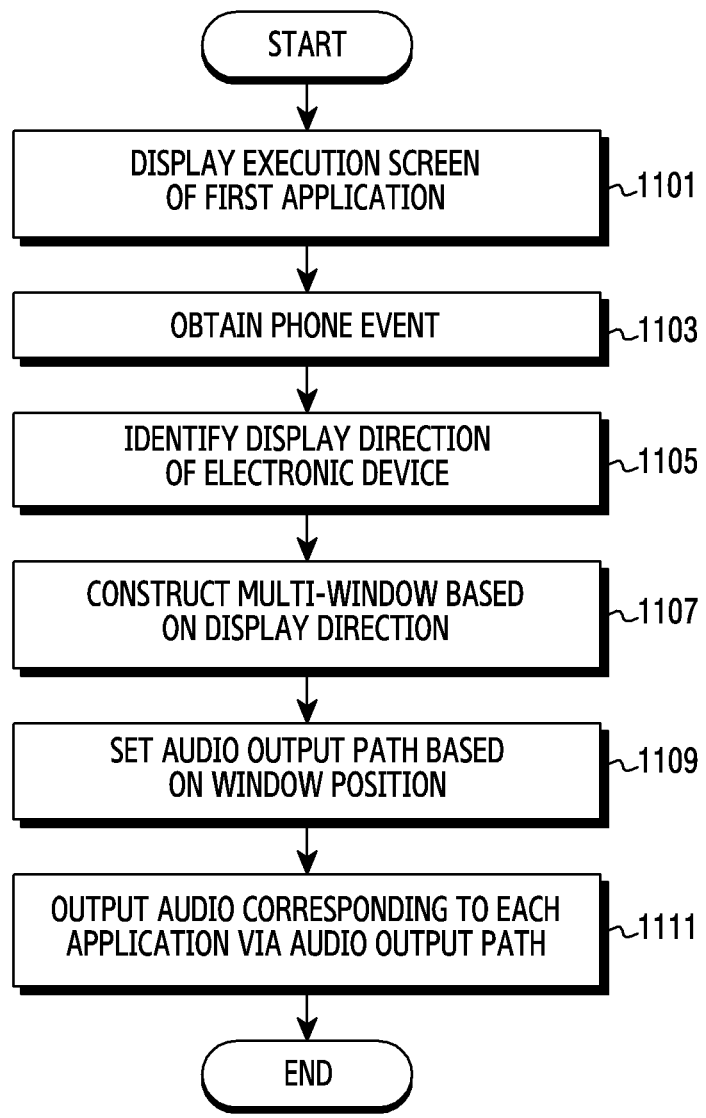
FIG. 11 is a flowchart illustrating a method of controlling audio output in accordance with a phone event in an electronic device according to various embodiments.

FIG. 11 is a flowchart illustrating a method of controlling audio output in accordance with a phone event in an electronic device according to various embodiments.

Referring to FIG. 11, in operation 1101, a processor (e.g., the processor 120) of an electronic device (e.g., the electronic device 101) may display an execution screen of a first application. The first application may output an audio as well, and may not output the audio as well. The first application may be an application different from an application associated with a phone. The application associated with the phone may include at least one of phone (e.g., voice call or video call) related functions included in a phone application, a video call application (e.g., face time), a Voice over Internet protocol (VoIP) application, and a messenger application.

In operation 1103, the processor 120 of the electronic device 101 may obtain a phone event. The phone event may be an event in which a call is received to the electronic device 101. Or, the phone event may be an event of requesting the execution of the application associated with the phone from a user. In response to receiving a request for the execution of the application associated with the phone in course of the execution of the first application, the processor 120 may construct a multi-window. Or, the processor 120 may construct the multi-window as well and may not construct the multi-window as well according to setting of the electronic device 101 or a user's selection. Also, the processor 120 may construct and display any one of the execution screen of the first application or a screen of the phone event in the form of a pop-up window according to setting of the electronic device 101 or a user's selection.

In response to the phone event being obtained in course of the execution of the first application, the processor 120 of various embodiments may distinguish whether earphones have been connected to a connection terminal (e.g., the connection terminal 178) of the electronic device 101. In response to the earphones being connected, the processor 120 may construct the multi-window. In response to the earphones not being connected, the processor 120 may not construct the multi-window. In response to not constructing the multi-window, the processor 120 may display the execution screen of the application associated with the phone, instead of the execution screen of the first application. That is, the processor 120 may process the first application as a background, and process the application associated with the phone as a foreground, to display on a display device (e.g., the display device 160) of the electronic device 101.

In response to the phone event being obtained during the execution of the first application, the processor 120 of various embodiments may distinguish whether the first application is an application in which audio output is possible, or is currently outputting an audio signal. In response to the first application being the application in which audio output is possible (or in response to being currently outputting the audio signal), the processor 120 may construct the multi-window. In response to the first application not being the audio output application, the processor 120 may not construct the multi-window.

In response to the phone event being obtained during the execution of the first application, the processor 120 of various embodiments may construct the multi-window based on information of the first application and the connection or non-connection of earphones. For example, in response to the first application being the audio output application, and the earphones being connected to the connection terminal 178, the processor 120 may construct the multi-window. In response to the first application being the audio output application, and the earphones not being connected to the connection terminal 178, the processor 120 may not construct the multi-window.

Or, in response to the first application being the audio output application, and the earphones not being connected to the connection terminal 178, the processor 120 may construct the multi-window, and control not to output an audio signal of the first application. In response to the first application not being the audio output application, and the earphones being connected to the connection terminal 178, the processor 120 may construct the multi-window. In response to the first application not being the audio output application, and the earphones not being connected to the connection terminal 178, the processor 120 may construct the multi-window or may not construct the multi-window. This is merely an issue of implementation, and the present disclosure is not limited by the description.

In operation 1105, the processor 120 of the electronic device 101 may identify a display direction of the electronic device 101. The display direction is a direction in which the electronic device 101 is put, and may be, for example, a vertical direction (or a vertical mode) or a horizontal direction (or a horizontal mode).

In operation 1107, the processor 120 of the electronic device 101 may construct the multi-window based on the display direction of the electronic device 101. In response to the display direction of the electronic device 101 being the vertical direction, the processor 120 may construct the multi-window wherein each window is divided up (e.g., first window) and down (e.g., second window). Also, in response to the display direction of the electronic device 101 being the horizontal direction, the processor 120 may construct the multi-window wherein each window is divided left (e.g., first window) and right (e.g., second window).

At the time of multi-window construction, the processor 120 may construct an execution screen of an application within a window based on at least one of a display direction of a multi-window, a display size or information (e.g., an attribute, a type, etc.) of the application. For example, the processor 120 may adjust a size of a letter included in the first application, or adjust an amount of information included in the first application. In response to the first application not being able to be displayed in the vertical direction (e.g., a game application and a video application), the processor 120 may display the execution screen of the first application in the horizontal direction, and display, as a non-used region, an up/down partial region of the window displayed in the horizontal direction as well.

In operation 1109, the processor 120 of the electronic device 101 may set an audio output path based on the window position. For example, the processor 120 may display the execution screen of the first application in the first window, and display the execution screen of the application associated with the phone in the second window. In this case, the processor 120 may set an audio output path wherein an audio signal of the first application displayed in the first window is outputted to a right terminal of earphones, and set an audio output path wherein an audio signal of the application associated with the phone displayed in the second window is outputted to a left terminal of the earphones. Also, it is vice versa.

In operation 1111, the processor 120 of the electronic device 101 may output an audio corresponding to each application via the set audio output path. The processor 120 may output the audio signal of the first application displayed in the first window, to the right terminal of the earphones, and output the audio signal of the application associated with the phone displayed in the second window, to the left terminal of the earphones.

Figure 12:
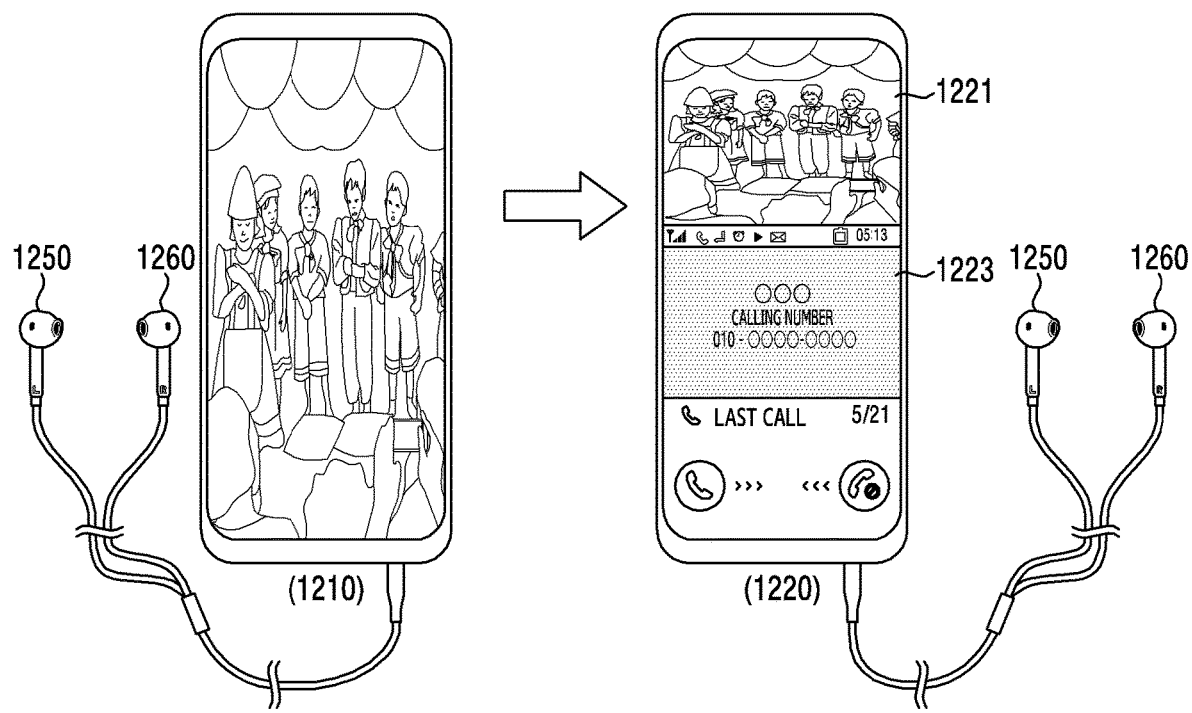
FIG. 12 is a diagram illustrating an example of controlling audio output in accordance with a phone event according to various embodiments.

FIG. 12 is a diagram illustrating an example of controlling audio output in accordance with a phone event according to various embodiments.

Referring to FIG. 12, a processor (e.g., the processor 120) of an electronic device (e.g., the electronic device 101) may provide a user interface 1210 including an execution screen of a first application. At the time of user interface 1210 provision, earphones (e.g., a left terminal 1250 of the earphones and a right terminal 1260 of the earphones) may be connected to a connection terminal (e.g., the connection terminal 178) of the electronic device 101. In response to a phone event being obtained while the user interface 1210 is displayed, the processor 120 may construct a multi-window, to provide a second user interface 1220. The processor 120 may set a first window 1221 to an upper side of a vertical direction, and set a second window 1223 to a lower side of the vertical direction, based on a display direction of the electronic device 101. The processor 120 may display the execution screen of the first application in the first window 1221, and display an execution screen of an application associated with a phone in the second window 1223. The processor 120 may output an audio signal of the first application displayed in the first window 1221, to the right terminal 1260 of the earphones, and output an audio signal of the application associated with the phone displayed in the second window 1223, to the left terminal 1250 of the earphones.

The processor 120 of various embodiments may identify an application that will be displayed in the first window 1221 based on information of the application or setting information of the electronic device 101. The setting information may be set to display a firstly executed application (e.g., the first application) in the first window 1221, and display a later executed application (e.g., the application associated with the phone) in the second window 1223. Or, it is vice versa. The processor 120 may identify the application that will be displayed in the first window 1221 based on priority order of the application. For example, in response to the application associated with the phone having higher priority order than the first application, the processor 120 may identify to display the application associated with the phone in the first window 1221, and display the first application in the second window 1223. Or, it is vice versa.

The processor 120 of various embodiments may construct a size of a multi-window differently based on information of an application or setting information of the electronic device 101. For example, in response to the application associated with the phone having higher priority order than the first application, the processor 120 may construct a size of the second window 1223 that will display the application associated with the phone, greater than a size of the first window 1221. That is, the processor 120 may display the execution screen of the application associated with the phone, greater than the execution screen of the first application. Or, it is vice versa.

Figure 13:
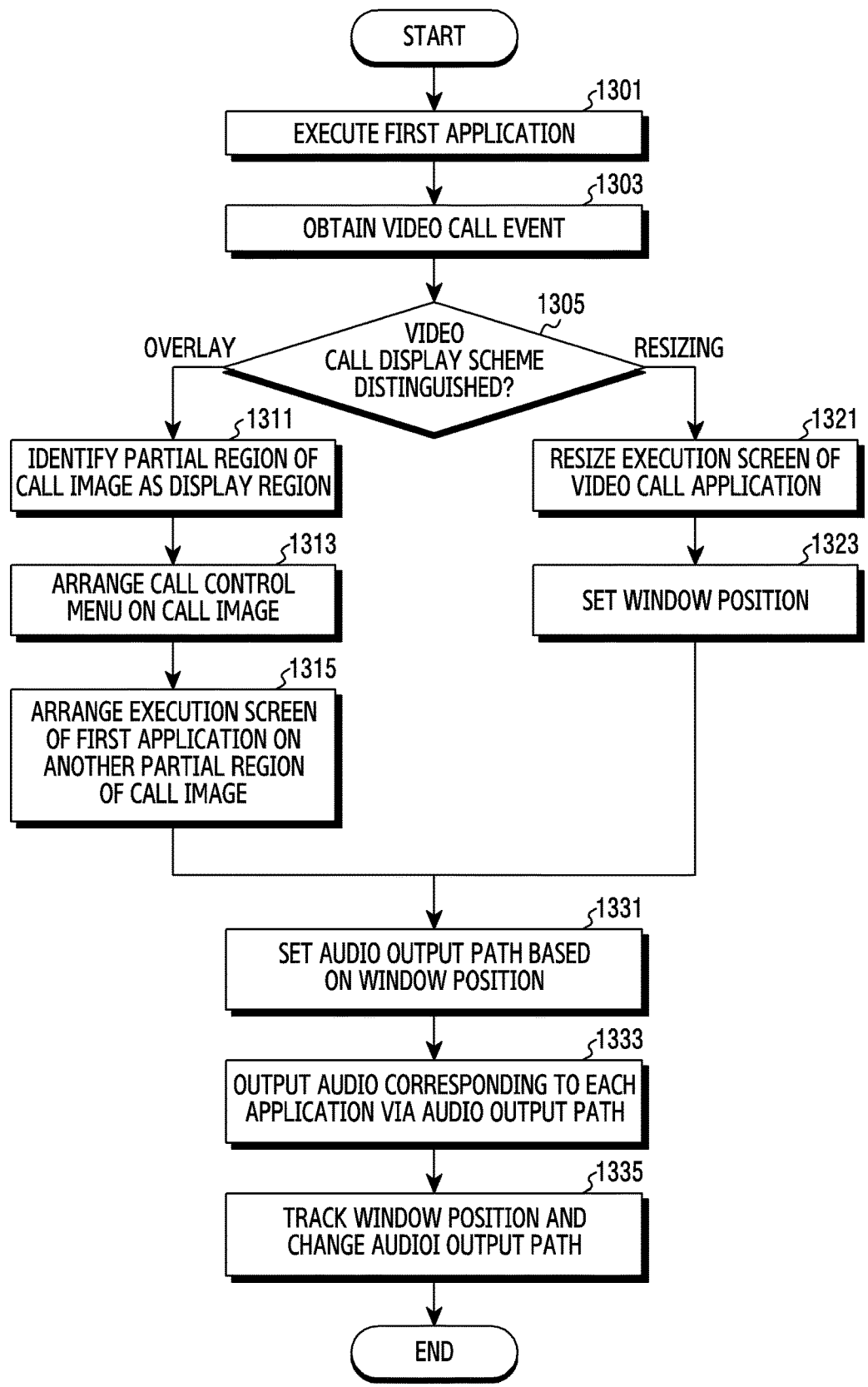
FIG. 13 is a flowchart illustrating a method of controlling audio output in accordance with a video call event in an electronic device according to various embodiments.

FIG. 13 is a flowchart illustrating a method of controlling audio output in accordance with a video call event in an electronic device according to various embodiments.

Referring to FIG. 13, in operation 1301, a processor (e.g., the processor 120) of an electronic device (e.g., the electronic device 101) may display an execution screen of a first application. The first application may output an audio as well, and may not output the audio as well. The first application may be an application which is different from an application associated with a video call. The application associated with the video call (hereinafter, referred to as a 'video call application') may include at least one of video call functions included in a video call application (e.g., face time), a voice over Internet protocol (VoIP) application, and a messenger application.

In operation 1303, the processor 120 of the electronic device 101 may obtain a video call event. The video call event may be an event of displaying a video received from a counterpart electronic device in a display device (e.g., the display device 160) of the electronic device 101 while making a call with a counterpart. In response to the video call event being obtained during the execution of the first application, the processor 120 may construct a multi-window. Or, the processor 120 may construct the multi-window as well and may not construct the multi-window as well according to setting of the electronic device 101 or a user's selection.

In operation 1305, the processor 120 of the electronic device 101 may distinguish a video call display scheme. The processor 120 may construct an execution screen of the video call application in the video call display scheme in order to provide the execution screen of the video call application through a multi-window. The video call display scheme may include an overlay scheme and a resizing scheme. The overlay scheme may be a scheme of overlaying and displaying the execution screen of the first application on a partial region of a call image. The resizing scheme may be a scheme of adjusting the execution screen of the video call application, to display concurrently with the execution screen of the first application. The video call display scheme may be previously set to the electronic device 101, or be set by a user.

In the overlay scheme, in operation 1311, the processor 120 of the electronic device 101 may identify a partial region of a call image as a display region. The execution screen of the video call application may include a call image and a call control menu. The call image may include a video (e.g., a counterpart image) received from a counterpart electronic device, and a video (e.g., my image) obtained from a camera (e.g., the camera module 180) of the electronic device 101. The call control menu includes a function item related with the call, and may include, for example, a call end button, a volume adjustment button, a keypad button, etc. In the execution screen of the video call application, the call control menu may be displayed on the call image.

To provide the execution screen of the video call application through the multi-window, the processor 120 may identify a partial region of the call image as a display region. For example, the call image may include all of a counterpart image and my image, and may be displayed centering on the counterpart image at the time of multi-window construction. In this case, the processor 120 may identify, as the display region, a region including only the counterpart image among the call image. The processor 120 may identify the partial region of the call image as the display region, based on a size of a window in which the execution screen of the video call application is arranged.

In operation 1313, the processor 120 of the electronic device 101 may arrange the call control menu on the call image. The processor 120 may overlay and arrange the call control menu on the call image which is identified as the display region. At this time, the processor 120 may construct the call control menu based on the size of the window in which the execution screen of the video call application is arranged. For example, in response to the size of the window being small, the processor 120 may delete some items among the call control menu, or decrease a size of the call control menu.

In operation 1315, the processor 120 of the electronic device 101 may arrange the execution screen of the first application in another partial region of the call image. The processor 120 may arrange the execution screen of the first application in the another partial region except the partial region of the call image identified in operation 1311. For example, in response to the call image being divided into a first region and a second region, and the first region being identified as the display region, the second region may be identified as a region in which the execution screen of the first application is arranged. Here, the first region (e.g., the partial region of the call image) may correspond to the first window, and the second region (e.g., the another partial region of the call image) may correspond to the second window. Or, the first region may correspond to the second window, and the second region (e.g., the another partial region of the call image) may correspond to the first window.

For this, the processor 120 may construct a first layer and a second layer, and may overlay and arrange the second layer in a partial region of the first layer. The first layer may include the execution screen of the video call application, and the second layer may include the execution screen of the first application. The processor 120 may display the partial region of the call image in a region actually seen to a user among the first layer and display the call control menu on the partial region of the call image.

In the resizing scheme, in operation 1321, the processor 120 of the electronic device 101 may resize the execution screen of the video call application. For example, the processor 120 may adjust the call image and the call control menu included in the execution screen of the video call application, adaptive to a window size. The processor 120 may reduce the whole size of the execution screen of the video call application based on a window size that will display the execution screen of the video call application. Or, the processor 120 may reduce a size of the call image or a size of the call control menu at a different rate based on the window size. Or, the processor 120 may construct the call control menu based on the adjusted size of the call image.

In operation 1323, the processor 120 of the electronic device 101 may set a window position. In response to the multi-window being constructed in a horizontal direction, the processor 120 may set the video call application to a first window positioned at a left side, and set the first application to a second window positioned at a right side. Or, the processor 120 may set to display an execution screen of the first application in the first window positioned at the left side, and display an execution screen of the video call application in the second window positioned at the right side.

The processor 120 of various embodiments may set the window position based on information of the application or setting information of the electronic device 101. Based on the setting information, the processor 120 may set the firstly executed first application to the first window, and set the later executed video call application to the second window. Or, the processor 120 may set the video call application to the first window and set the first application to the second window, based on priority order of the application.

In operation 1331, the processor 120 of the electronic device 101 may set an audio output path based on the window position. In response to the multi-window being constructed in the horizontal direction, the processor 120 may set an audio output path corresponding to the video call application displayed at a left side (e.g., first window), to a right terminal of earphones, and set an audio output path corresponding to the first application displayed at a right side (e.g., second window), to a left terminal of the earphones. Or, the processor 120 may set the audio output path corresponding to the first application displayed at the left side (e.g., first window), to the right terminal of the earphones, and set the audio output path corresponding to the video call application displayed at the right side (e.g., second window), to the left terminal of the earphones.

In operation 1333, the processor 120 of the electronic device 101 may output an audio corresponding to each application via the set audio output path. For example, the processor 120 may control to output an audio signal corresponding to the video call application displayed in the first window, to the right terminal of the earphones via the first audio output path. The processor 120 may control to output an audio signal corresponding to the first application displayed in the second window, to the left terminal of the earphones via the second audio output path.

In operation 1335, the processor 120 of the electronic device 101 may track the window position, to control the audio output path. The processor 120 may change the execution screen of the application and the audio output path based on the window position which is switched according to whether a user input for the window position switching is obtained. The processor 120 of various embodiments may recognize a talker by using the camera module 180 of the electronic device 101, and distinguish whether a position of a user who makes a video call is changed based on the talker recognition, to change the window position according to a user position change.

Figure 14:
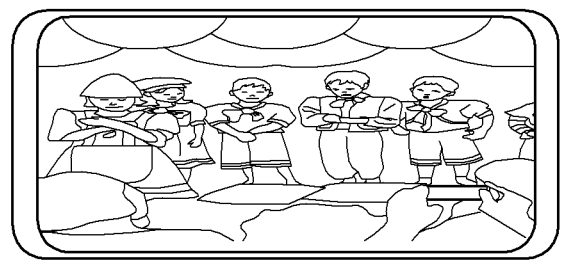
FIG. 14 is a diagram illustrating an example of constructing a multi-window based on a video call application in an electronic device according to various embodiments.
Figure 14:
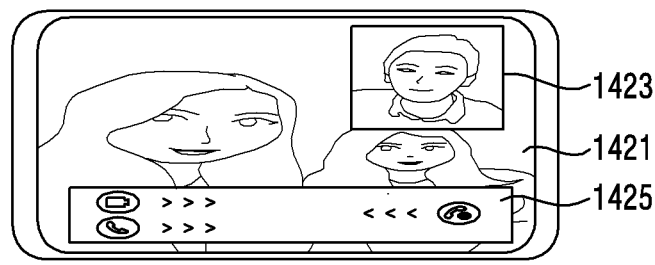
Figure 14:
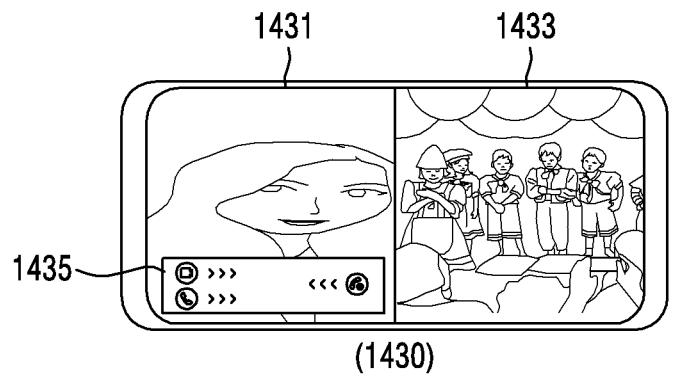
Figure 14:
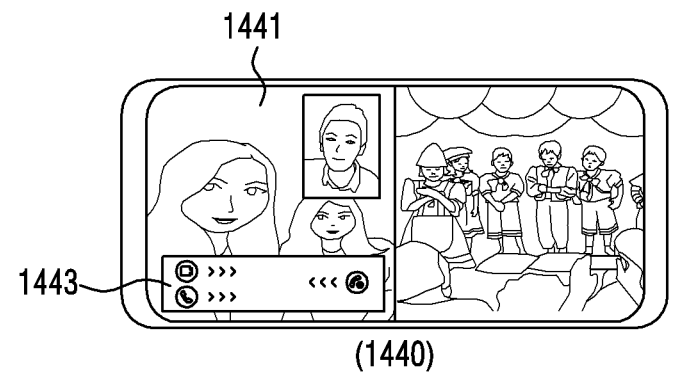

FIG. 14 is a diagram illustrating an example of constructing a multi-window based on a video call application in an electronic device according to various embodiments.

Referring to FIG. 14, a processor (e.g., the processor 120) of an electronic device (e.g., the electronic device 101) may provide a first user interface 1410 including an execution screen of a first application. The first application may be an application different from a video call application. The processor 120 may provide a second user interface 1420 including an execution screen of the video call application. The second user interface 1420 may include a call image including a counterpart image 1421 received from a counterpart electronic device and my image 1423 obtained from a camera (e.g., the camera module 180) of the electronic device 101, and a call control menu 1425. The call control menu 1425 may be overlaid and displayed on the call image.

At the time of displaying the execution screens of the first application and the video call application through the multi-window, the processor 120 may provide a third user interface 1430 or a fourth user interface 1440. The third user interface 1430 may construct the multi-window in an overlay scheme. For example, the third user interface 1430 may display a call control menu 1435 on a partial region 1431 of the call image of the video call application, and overlay and display the execution screen of the first application in another partial region 1433 of the call image. The partial region 1431 may be a region which includes only the counterpart image 1421 among the call image which includes the counterpart image 1421 and my image 1423. The processor 120 may adjust a size of the call control menu 1435 based on a size of the partial region 1431.

The fourth user interface 1440 may construct the multi-window in a resizing scheme. For example, the fourth user interface 1440 may decrease and display the whole size of the execution screen of the video call application based on a size of a first window 1441, and display the execution screen of the first application in a second window. That is, the fourth user interface 1440 may adjust a call image and a call control menu 1443 small at the same rate. Or, the processor 120 may reduce a size of the call image or a size of the call control menu 1443 at a different rate based on the size of the first window 1441. Or, the processor 120 may construct the call control menu 1443 based on the adjusted size of the call image.

In FIG. 14, the earphones are not illustrated, but it may be in a state in which one or more earphones are connected to a connection terminal (e.g., the connection terminal 178) of the electronic device 101.

Figure 15:
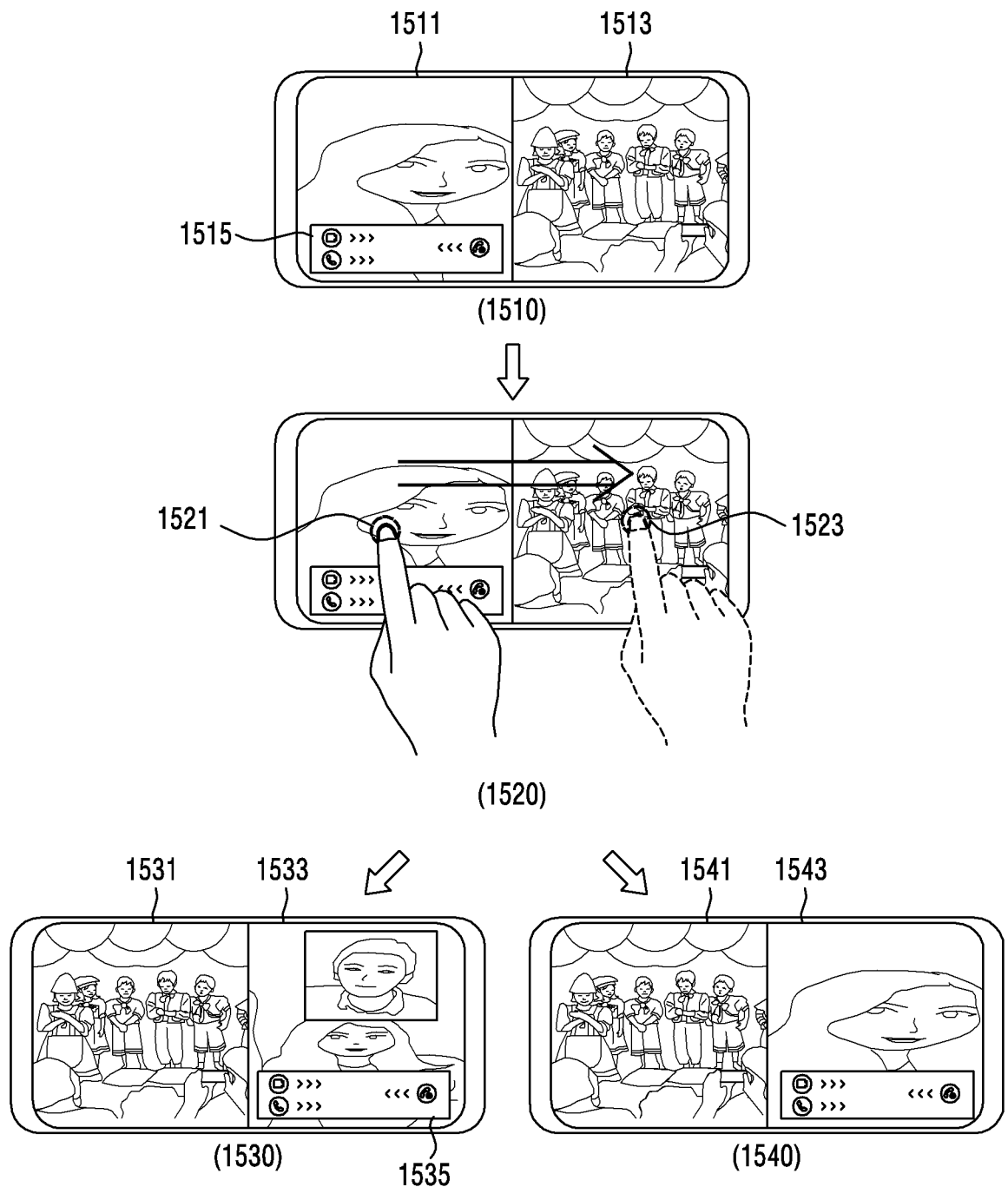
FIG. 15 is a diagram illustrating an example of controlling a user interface associated with a video call application in accordance with a window position change in an electronic device according to various embodiments.

FIG. 15 is a diagram illustrating an example of controlling a user interface associated with a video call application in accordance with a window position change in an electronic device according to various embodiments.

Referring to FIG. 15, a processor (e.g., the processor 120) of an electronic device (e.g., the electronic device 101) may provide a first user interface 1510 constructing a multi-window divided into two ones in a horizontal direction. The first user interface 1510 may display a call control menu 1515 in a partial region 1511 of a call image of a video call application, and overlay and display an execution screen of a first application in another partial region 1513 of the call image. The processor 120 may set an audio output path to output an audio signal corresponding to the video call application displayed at a left side, to a right terminal of earphones, and output an audio signal corresponding to the first application displayed at a right side, to a left terminal of the earphones.

The processor 120 may receive a user input on a second user interface 1520. The second user interface 1520 may be identical with the first user interface 1510. The user input may be an input in which a touch 1521 is obtained on the execution screen of the video call application, and the obtained touch 1521 is dragged (1523) to the execution screen of the first application and is released (e.g., dropped).

In response to the user input being obtained, the processor 120 may provide a third user interface 1530 or a fourth user interface 1540 converting an execution screen of an application within a window. The third user interface 1530 may display the execution screen of the first application on a partial region 1531 of a call image of the video call application, and display a call control menu 1535 on another partial region 1533 of the call image. The partial region 1531 of the call image may be a region (e.g., the partial region 1511 and a counterpart image) which has been displayed at the time of providing the first user interface 1510 or the second user interface 1520. Another partial region 1533 of the call image may be a region (e.g., the another partial region 1513, part of the counterpart image, and my image) which has not been displayed at the time of providing the first user interface 1510 or the second user interface 1520. That is, in the first user interface 1510 or the second user interface 1520, the another partial region 1533 of the call image may be hidden by the execution screen of the first application.

The fourth user interface 1540 may display the execution screen of the first application on another partial region 1541 of a call image of a video call application, and display a call control menu in a partial region 1543 of the call image. The another partial region 1541 of the call image may be identical with the region (e.g., the another partial region 1513, part of the counterpart image, and my image) which has not been displayed in the first user interface 1510 or the second user interface 1520. The partial region 1543 of the call image may be the region (e.g., the partial region 1511 and the counterpart image) which has been displayed in the first user interface 1510 or the second user interface 1520.

At the time of providing the third user interface 1530 or the fourth user interface 1540, the processor 120 may set an audio output path wherein the audio signal corresponding to the first application displayed at the left side is outputted to the right terminal of the earphones, and the audio signal corresponding to the video call application displayed at the right side is outputted to the left terminal of the earphones.

An operation method of an electronic device of various embodiments may include displaying execution screens associated with a first application and a second application through a multi-window, respectively, and outputting an audio signal corresponding to the first application and an audio signal corresponding to the second application, to a left terminal of the earphones or a right terminal thereof, separately based on a window position corresponding to each execution screen.

The outputting may include identifying the window position corresponding to the execution screen, identifying an audio output path based on the identified window position, and outputting the audio signal corresponding to each application via the identified audio output path.

The outputting may include outputting the audio signal corresponding to the first application displayed in a first window, to the right terminal of the earphones, and outputting the audio signal corresponding to the second application displayed in a second window, to the left terminal of the earphones.

The method may further include sensing window position switching, to change a window displaying an execution screen of each application, and change an audio output path based on a switched window position.

A computer-readable recording medium of various embodiments may include a program of executing displaying execution screens associated with a first application and a second application through a multi-window, respectively, and outputting an audio signal corresponding to the first application and an audio signal corresponding to the second application, to a left terminal of the earphones or a right terminal thereof, separately based on a window position corresponding to each execution screen.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

According to various embodiments, it is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   an audio module;
   a display;
   a connection terminal connected to earphones;
   a communication interface; and
   a processor electrically connected to the audio module, the display, the connection terminal, or the communication interface,
   wherein the processor is configured to:
      display, via a multi-window of the display, respectively execution screens associated with a first application and a second application, the execution screens including a first screen corresponding to the first application and a second screen corresponding to the second application, the first screen being displayed in a first window of the multi-window, the second screen being displayed in a second window of the multi-window, a display area of the display being divided into the first window and the second window,
      detect that the earphones are connected to the connection terminal,
      identify a number of the multi-window and a number of the connected earphones,
      based on the number of the multi-window and the number of the connected earphones, determine an earphone and terminal of the determined earphone to output an audio signal corresponding to each window of the multi-window,
      output the audio signal corresponding to the each window of the multi-window through the determined earphone and the determined terminal of the determined earphone,
      detect an input for displaying a control menu, the input comprising a drag input for moving from a bezel region of the display to the display area of the display, in response to the detecting the input, display, via the display, the control menu including a first volume bar for adjustment of a volume of the first application and a second volume bar for adjustment of a volume of the second application, wherein the first volume bar and the second volume bar are simultaneously displayed on the first screen and the second screen, respectively, receive a user input for switching the first window and the second window, the user input comprising a touch input for touching the first screen and a drag input for moving the touch input from the first screen to the second screen, in response to the receiving the user input, display the first screen through the second window, and the second screen through the first window, and based on a position of switched window, output the audio signal corresponding to the each window of the multi-window.

2. The electronic device of claim 1, wherein the processor is configured to identify the window position corresponding to the execution screen, and identify an audio output path based on the identified window position, and output the audio signal corresponding to each application via the identified audio output path.

3. The electronic device of claim 1, wherein the processor is configured to set an audio output path corresponding to each window in consideration of at least one of a display direction of the electronic device, a number of multi-window or the number of the earphones.

4. The electronic device of claim 1,
the first window is arranged at a left side of a horizontal direction, or is arranged at an upper side of a vertical direction, and
the second window is arranged at a right side of the horizontal direction, or is arranged at a lower side of the vertical direction.

5. The electronic device of claim 1, wherein the processor is configured to adjust a volume level of the first application and a volume level of the second application differently based on an obtained user input.

6. An electronic device comprising:
an audio module;
a display;
a connection terminal connected to earphones;
a communication interface; and
a processor electrically connected to the audio module, the display, the connection terminal, or the communication interface,
wherein the processor is configured to:
display an execution screen of a first application,
construct a multi-window in response to a phone event being obtained,
display, via the multi-window of the display, respectively execution screens of the first application and an application associated with a phone, the execution screens including a first screen corresponding to the first application and a second screen corresponding to the application associated with the phone, the first screen being displayed in a first window of the multi-window, the second screen being displayed in a second window of the multi-window, a display area of the display being divided into the first window and the second window,
detect that the earphones are connected to the connection terminal,
identify a number of the multi-window and a number of the connected earphones,
based on the number of the multi-window and the number of the connected earphones, determine an earphone and terminal of the determined earphone to output an audio signal corresponding to each window of the multi-window,
output the audio signal corresponding to the each window of the multi-window through the determined earphone and the determined terminal of the determined earphone,
detect an input for displaying a control menu, the input comprising a drag input for moving from a bezel region of the display to the display area of the display,
in response to the detecting the input, display, via the display, the control menu including a first volume bar for adjustment of a volume of the first application and a second volume bar for adjustment of a volume of the second application, wherein the first volume bar and the second volume bar are simultaneously displayed on the first screen and the second screen, respectfully,
receive a user input for switching the first window and the second window, the user input comprising a touch input for touching the first screen and a drag input for moving the touch input from the first screen to the second screen,
in response to the receiving the user input, display the first screen through the second window, and the second screen through the first window, and
based on a position of switched window, output the audio signal corresponding to the each window of the multi-window.

7. The electronic device of claim 6, wherein the processor is configured to identify a display direction of the multi-window as one of a horizontal direction or a vertical direction based on the display direction of the electronic device.

8. The electronic device of claim 6, wherein the processor is configured to set a window that will display the execution screen of the application associated with the phone, based on information of the application or setting information of the electronic device.

9. The electronic device of claim 6, wherein the processor is configured to, in response to a video call event being obtained while the execution screen of the first application is displayed, identify a video call display scheme, and construct the multi-window based on the video call display scheme.

10. The electronic device of claim 9, wherein the processor is configured to:
in response to the video call display scheme being an overlay scheme, overlay and display the execution screen of the first application in a partial region of a call image comprised in the application associated with the video call.

11. The electronic device of claim 9, wherein the processor is configured to, in response to the video call display scheme being a resizing scheme, adjust the execution screen of the application associated with the video call, to display the same concurrently with the execution screen of the first application.

12. The electronic device of claim 6, wherein the processor is configured to construct any one of the execution screen of the first application or the execution screen of the application associated with the phone, in a form of a pop-up window, according to setting of the electronic device or a user's selection.

13. The electronic device of claim 6, wherein the processor is configured to construct an execution screen of an application within each window based on at least one of a display direction of the multi window, a display size of the multi-window or information of the application.

14. The electronic device of claim 7, wherein the processor is configured to:
in response to obtaining a user input for window position switching, overlay and display the execution screen of the first application in another partial region of a call image, and display the partial region of the call image.

15. An operation method of an electronic device, the method comprising:
displaying, via a multi-window of a display, respectively execution screens associated with a first application and a second application, the execution screens including a first screen corresponding to the first application and a second screen corresponding to the second application, the first screen being displayed in a first window of the multi-window, the second screen being displayed in a second window of the multi-window, a display area of the display being divided into the first window and the second window;
detecting that earphones are connected to a connection terminal of the electronic device;
identifying a number of multi-window and a number of the connected earphones;
based on the number of the multi-window and the number of the connected earphones, determining an earphone and terminal of the determined earphone to output an audio signal corresponding to each window of the multi-window,
outputting the audio signal corresponding to the each window of the multi-window through the determined earphone and the determined terminal of the determined earphone;
detecting an input for displaying a control menu, the input comprising a drag input for moving from a bezel region of the display to the display area of the display;
in response to the detecting the input, displaying, via the display, the control menu including a first volume bar for adjustment of a volume of the first application and a second volume bar for adjustment of a volume of the second application, wherein the first volume bar and the second volume bar are simultaneously displayed on the first screen and the second screen, respectfully;
receiving a user input for switching the first window and the second window, the user input comprising a touch input for touching the first screen and a drag input for moving the touch input from the first screen to the second screen;
in response to the receiving the user input, displaying the first screen through the second window, and the second screen through the first window; and
based on a position of switched window, outputting an audio signal corresponding to the each window of the multi-window.

16. The method of claim 15, wherein the outputting comprises:
identifying the window position corresponding to the execution screen;
identifying an audio output path based on the identified window position; and
outputting the audio signal corresponding to each application via the identified audio output path.

17. The method of claim 15, wherein the outputting comprises:
outputting the audio signal corresponding to the first application displayed in the first window, to a right terminal of the earphones; and
outputting the audio signal corresponding to the second application displayed in the second window, to a left terminal of the earphones.

* * * * *